US011188902B1

(12) United States Patent
Sano et al.

(10) Patent No.: US 11,188,902 B1
(45) Date of Patent: Nov. 30, 2021

(54) LIVE TIME CONNECTION APPLICATION METHOD AND DEVICES

(71) Applicants: Louise Dorothy Saulog Sano, Sheridan, WY (US); Manuel Isaac Sano, Sheridan, WY (US)

(72) Inventors: Louise Dorothy Saulog Sano, Sheridan, WY (US); Manuel Isaac Sano, Sheridan, WY (US)

( * ) Notice: Subject to any disclaimer, the term of this patent is extended or adjusted under 35 U.S.C. 154(b) by 0 days.

(21) Appl. No.: 16/879,566

(22) Filed: May 20, 2020

(51) Int. Cl.
*G06Q 30/00* (2012.01)
*G06Q 20/38* (2012.01)
*G06Q 30/02* (2012.01)
*H04L 29/06* (2006.01)
*G06Q 20/10* (2012.01)
(Continued)

(52) U.S. Cl.
CPC ........... *G06Q 20/384* (2020.05); *G06Q 20/10* (2013.01); *G06Q 20/123* (2013.01); *G06Q 30/0251* (2013.01); *G06T 19/006* (2013.01); *H04L 9/0643* (2013.01); *H04L 63/302* (2013.01); *H04L 63/306* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS 10,250,948 B1 * 4/2019 Bortz ................. H04N 21/2743
10,732,721 B1 * 8/2020 Clements ........... G02B 27/0172
(Continued)

FOREIGN PATENT DOCUMENTS

EP 3621270 A1 * 3/2020 ........... G06Q 20/389
JP 2015053061 A * 3/2015 ............. A63F 13/52
(Continued)

OTHER PUBLICATIONS

Qbit Technologies. How the Blockchain and VR are disrupting eCommerce. (Dec. 18, 2017). Retrieved online Nov. 19, 2020. https://www.qbittech.com/index.php/vr-blog/item/102-how-the-blockchain-and-vr-are-disrupting-ecommerce. (Year: 2017).*
(Continued)

*Primary Examiner* — James A Reagan
(74) *Attorney, Agent, or Firm* — Edmond DeFrank

(57) ABSTRACT

The embodiments disclose a method including creating a live time connection platform for providing users with live time connection application purposes including augmented reality, users logged into the live time connection application earn from a group of compensation forms comprising cryptocurrency, fiat money, credit, and award for their participation on the application per unit of time, users logged into the live time connection application earn to access saved data including at least one from a group of videos, GIFs, texts, blogs, pictures, feeds, multisensory experiences, and other content, users using earnings make purchases from advertisers at an on-line store, using digital devices to login to the live time connection application, providing security to look for key words from user reported connection abuses, flagging abusers and reporting to police where appropriate, and providing geo advertising facilitates users choosing targeted advertising according to their interests and demographics from advertisers in their location.

20 Claims, 23 Drawing Sheets

(51) Int. Cl.
*H04L 9/06* (2006.01)
*G06T 19/00* (2011.01)
*G06Q 20/12* (2012.01)

(56) References Cited

U.S. PATENT DOCUMENTS

| | | | | |
|---|---|---|---|---|
| 2017/0365101 | A1* | 12/2017 | Samec | G02B 27/017 |
| 2018/0107814 | A1* | 4/2018 | Wu | G06F 21/32 |
| 2018/0107815 | A1* | 4/2018 | Wu | G06F 3/011 |
| 2018/0197172 | A1* | 7/2018 | Coburn | A63F 13/792 |
| 2018/0309808 | A1* | 10/2018 | Andon | H04L 65/403 |
| 2018/0342106 | A1* | 11/2018 | Rosado | A63F 13/86 |
| 2020/0034025 | A1* | 1/2020 | Brady | G06T 13/205 |
| 2020/0099640 | A1* | 3/2020 | Andre | G06Q 50/265 |
| 2020/0120023 | A1* | 4/2020 | Munson | H04L 63/0478 |
| 2020/0258099 | A1* | 8/2020 | Alghamdi | G06Q 30/0201 |

FOREIGN PATENT DOCUMENTS

| | | | | |
|---|---|---|---|---|
| JP | 2019166405 A | * | 10/2019 | G06F 3/012 |
| JP | 2020099083 A | * | 6/2020 | H04N 13/111 |

OTHER PUBLICATIONS

Jan Wozniak. Blockchain and AR/VR—A match made in virtual heaven? (Apr. 5, 2018). Retrieved online Jul. 25, 2021. https://medium.com/trivial-co/blockchain-and-ar-vr-a-match-made-in-virtual-heaven-26e54782be56 (Year: 2018).*

IBM. How Extended Reality Will Reshape Commerce. (Dec. 13, 2019). Retrieved online Jul. 25, 2021. https://www.ibm.com/downloads/cas/GAZR2Z69 (Year: 2019).*

* cited by examiner

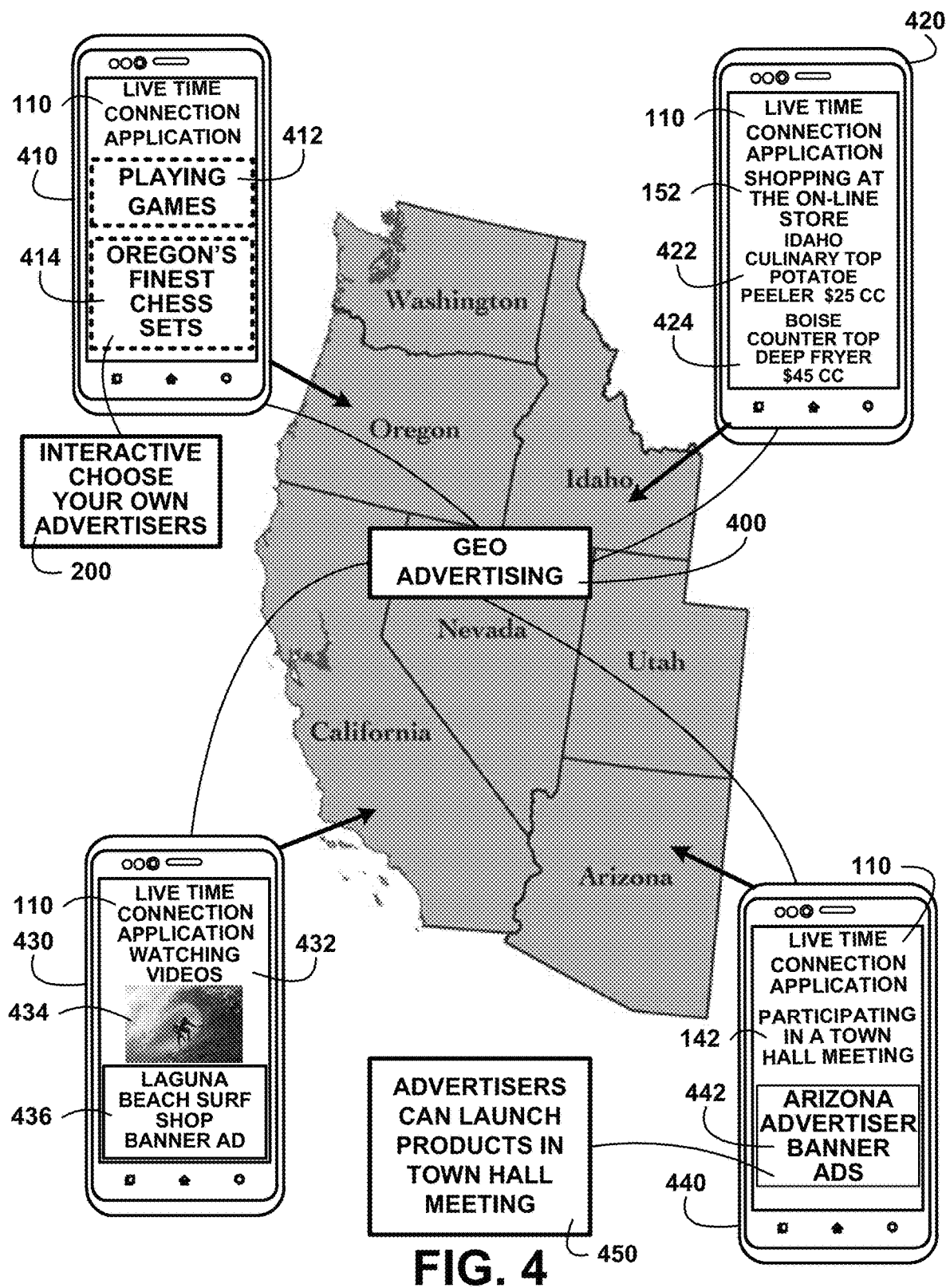

LIVE TIME CONNECTION APPLICATION METHOD AND DEVICES

BACKGROUND

Today's population is spending a lot of their time and money using applications to access the internet for buying products and social interaction. Applications are used for person to person communications, group chats, and other activities. Some of the applications being used are free and others must be paid for by the consumer. What is needed is a method whereby by the consumer is paid for all the time spent using the application.

BRIEF DESCRIPTION OF THE DRAWINGS

FIG. 4 shows for illustrative purposes only an example of geo advertising of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a live time connection application method and devices is described for illustrative purposes and the underlying system can apply to any number and multiple types of user on-line purposes. In one embodiment of the present invention, the live time connection application method and devices can be configured using different forms of digitally produced reality. The live time connection application method and devices can be configured to include users earning cryptocurrency for time using the application and can be configured to include users buying advertisers products with their earned cryptocurrency using the present invention.

Figure 1:
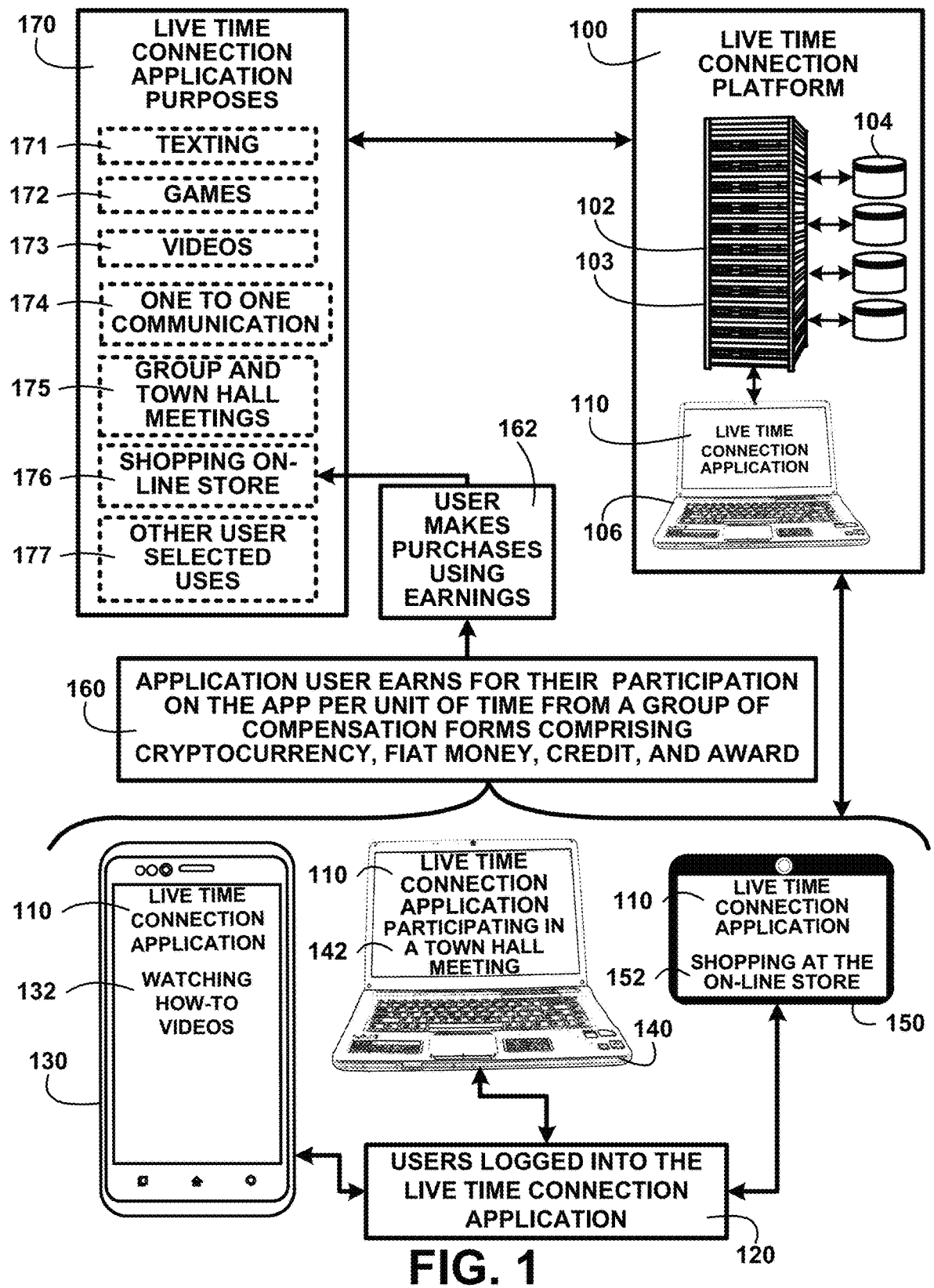
FIG. 1 shows for illustrative purposes only an example of an overview of live time connection application method and devices of one embodiment.

FIG. 1 shows for illustrative purposes only an example of an overview of live time connection application method and devices of one embodiment. FIG. 1 shows a live time connection platform 100 with at least one digital server 102, live time connection website 103, a plurality of databases 104, live time connection platform computer 106 with a live time connection application 110 installed. Users logged into the live time connection application 120 include one user on a user phone 130 with the live time connection application 110 watching how-to videos 132. In another instance a user is logged in on their user laptop computer 140 with the live time connection application 110 participating in a town hall meeting 142. A user tablet 150 with the live time connection application 110 is used for shopping at the on-line store 152.

In yet another instance, users (initiators and receivers) also earn to access saved data including for example at least one from a group of videos, GIFs, texts, blogs, pictures, feeds, multisensory experiences, and other content. In all four examples an application user earns for their participation on the app per unit of time from a group of compensation forms comprising cryptocurrency, fiat money, credit, and award 160. A user can make purchases using earnings from a group of compensation forms comprising cryptocurrency, fiat money, credit, and award. A user makes purchases using earnings 162 shopping at on-line stores 176, one of the live time connection application purposes 170. Other purposes include at least one from a group of texting 171, games 172, videos 173, one to one communication 174, group and town hall meetings 175, and other user selected uses 177 including mixed reality, multisensory experiences, video, audio, text, pictures, GIF, avatar, animation, and blog of one embodiment.

DETAILED DESCRIPTION

Figure 2:
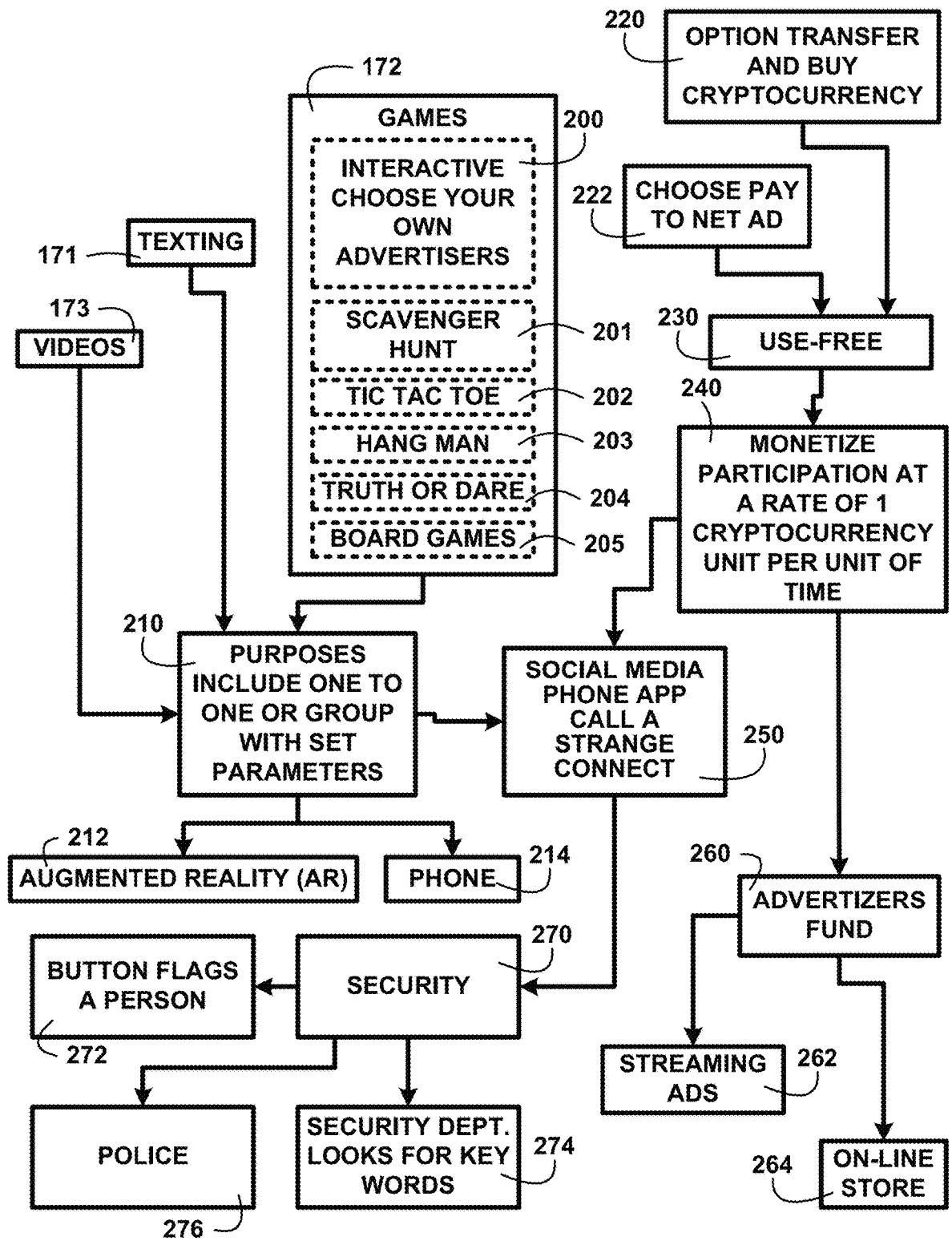
FIG. 2 shows a block diagram of an overview of a method to monetize participation of one embodiment.

FIG. 2 shows a block diagram of an overview of a method to monetize participation of one embodiment. FIG. 2 shows live time connection application purposes 170 of FIG. 1 including games 172. A user can employ a feature to interactive choose your own advertisers 200, wherein the advertisers can display for example ad banners during game play. Games include for example scavenger hunt 201, tic tac toe 202, hang man 203, truth or dare 204, and board games 205. The live time connection application purposes 170 of FIG. 1 include texting 171 and other purposes include videos 173. Purposes include one to one or group with set parameters 210 interactions. These interactions include augmented reality (AR) 212 and include phone 214 settings.

A user can option, transfer and buy cryptocurrency 220. An advertiser can choose pay to get ad 222. The users use-free 230 the live time connection application 110. The time connection application method and devices is configured to monetize participation at a rate of 1 cryptocurrency unit per unit of time 240 for the users. Advertisers pay into an advertiser's fund 260 for streaming ads 262 and on-line store 264 participations.

Users when finding a social media phone app call a strange connection 250 can notify security 270. The security department looks for key words 274 from the reported connection. The security dept. can activate a button for flagging a person 272 and/or contact police 276 based on their assessment of the situation and circumstances. The security department looks for key words 274 also to track connection traffic to determine if a user is violating any laws or using the connection for illicit purposes, breaking the law, terrorism, bullying, stalking, identity theft, or any other unacceptable behavior. The security department will report to police or appropriate law enforcement agency any user that is suspected of violating the law. For unacceptable behavior that may not have reached a level that is unlawful the security department can send the user an initial cease and desist of the activity and if the user's connection is detected as using the offending key words or is report can block the user from the system of one embodiment.

Figure 3A:
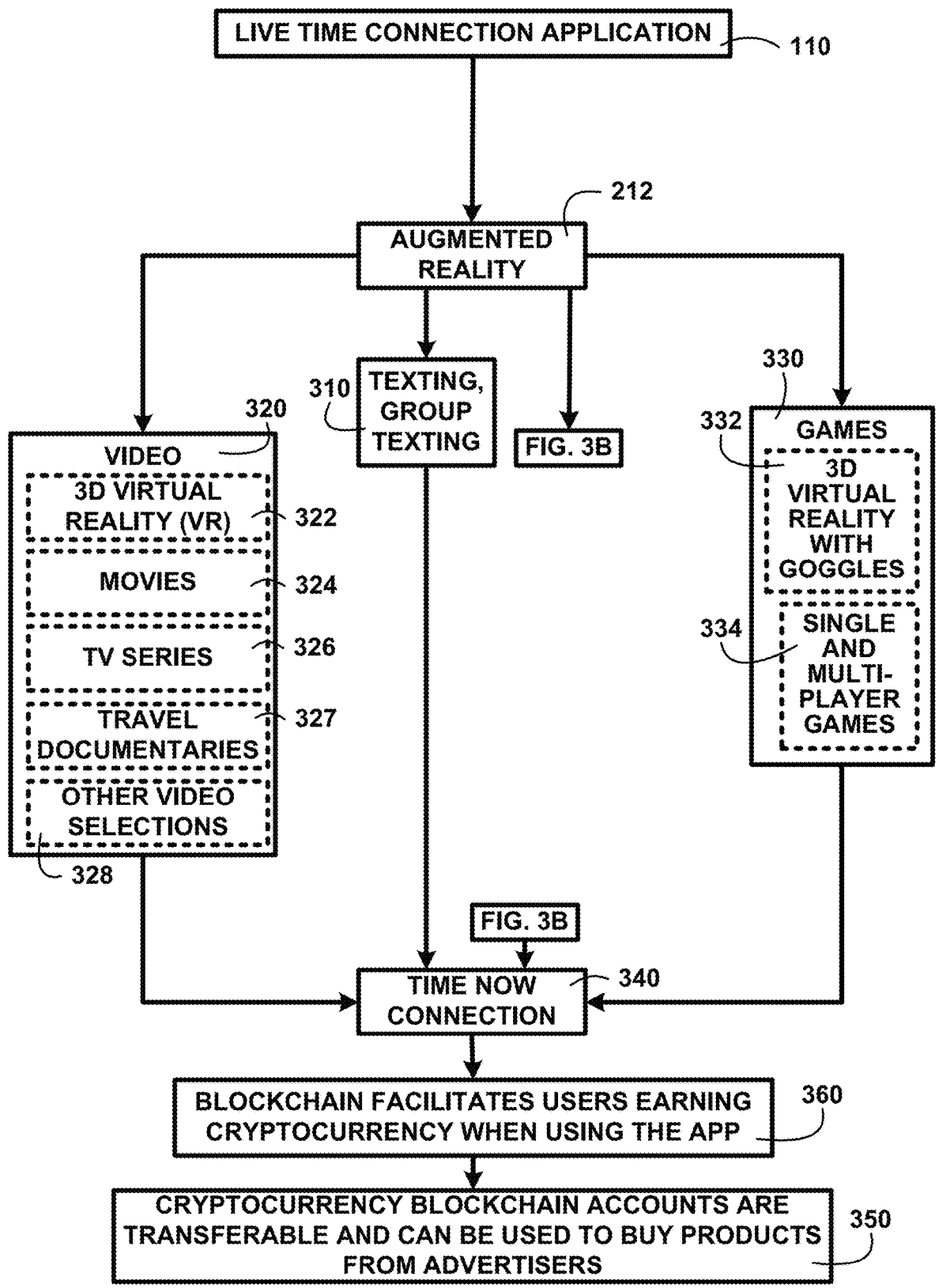
FIG. 3A shows a block diagram of an overview of live time connection application of one embodiment.

Live time connection application:

FIG. 3A shows a block diagram of an overview of live time connection application of one embodiment. FIG. 3A shows the live time connection application 110 for in one embodiment creating an augmented reality 212 for the user. The live time connection application 110 user can use a video 320 feature for viewing and participating in 3D virtual reality (VR) 322, augmented reality (AR) 212, movies 324, TV series 326, travel documentaries 327, and other video selections 328. The live time connection application 110 provides features for texting and group texting 310. Another feature is games 330 including 3D virtual reality with goggles 332 and single and multi-player games 334. Additional forms of interaction are described in FIG. 3B. A time now connection 340 is used to track user time using the application for the user earning cryptocurrency for their time using the application. Blockchain facilitates users earning cryptocurrency when using the app 360. Cryptocurrency blockchain accounts are transferable and can be used to buy products from advertisers 350 of one embodiment.

Figure 3B:
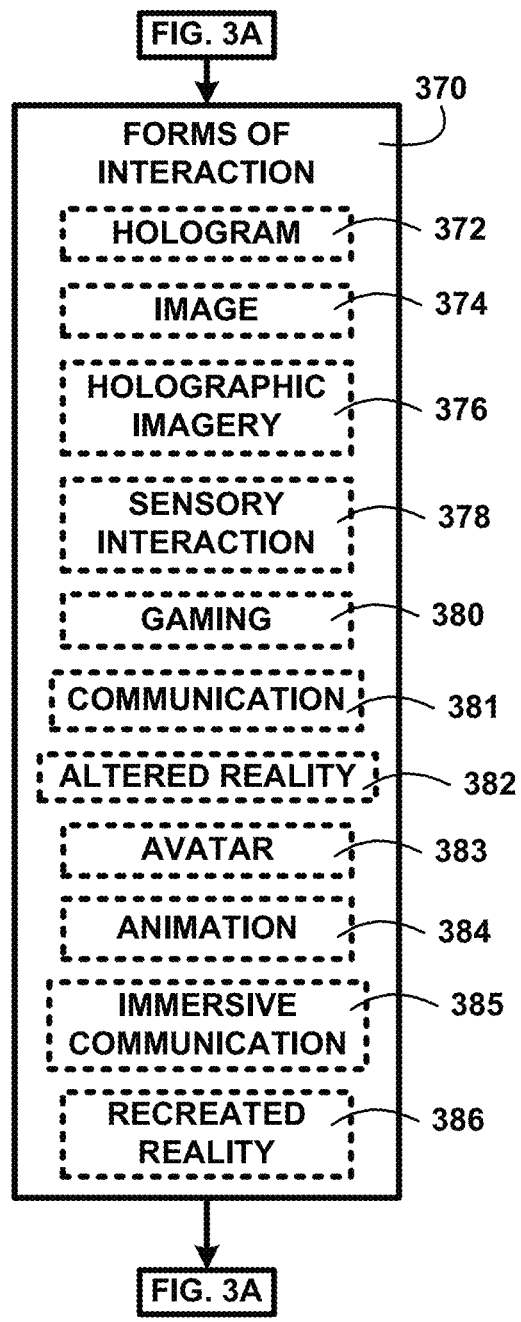
FIG. 3B shows a block diagram of an overview of forms of interaction of one embodiment.

Forms of interaction:

FIG. 3B shows a block diagram of an overview of forms of interaction of one embodiment. FIG. 3B shows a continuation from FIG. 3A, showing additional forms of interaction 370 when using the live time connection application 110 of FIG. 1. The additional forms of interaction 370 include hologram 372, image 374, holographic imagery 376, sensory interaction 378, gaming 380, communication 381, altered reality 382, avatar 383, animation 384, immersive communication 385, and recreated reality 386 and returning to FIG. 3A for additional processes of one embodiment.

Geo advertising:

FIG. 4 shows for illustrative purposes only an example of geo advertising of one embodiment. FIG. 4 shows one benefit of the live time connection application 110 is the interactive choose your own advertisers 200 feature. In one example geo advertising 400 is being used on an Oregon user phone 410 with the live time connection application 110 for playing games 412. The Oregon user phone 410 is displaying Oregon's finest chess sets 414 chosen by the Oregon user of one embodiment.

In another example an Idaho user phone 420 with the live time connection application 110 shows the user shopping at the on-line store 152. The user has chosen advertisers including Idaho culinary top potato peeler $25 cc 422 and Boise counter top deep fryer $45 cc 424 where "cc" means cryptocurrency of one embodiment.

A California user phone 430 with the live time connection application 110 is used for watching videos 432 for example a surfing video 434. The California user phone 430 is displaying a chosen advertiser Laguna Beach Surf Shop banner ad 436 of one embodiment.

FIG. 4 shows also an Arizona user phone 440 with the live time connection application 110 installed. The user is participating in a town hall meeting 142. The user's phone is displaying Arizona advertiser banner ads 442. Geo advertising includes targeted advertising based on key words, interests, demographics, geographic location, and user's profile. The organizers of a town hall meeting can make arrangements where advertisers can launch products in town hall meeting 450 of one embodiment.

Figure 5:
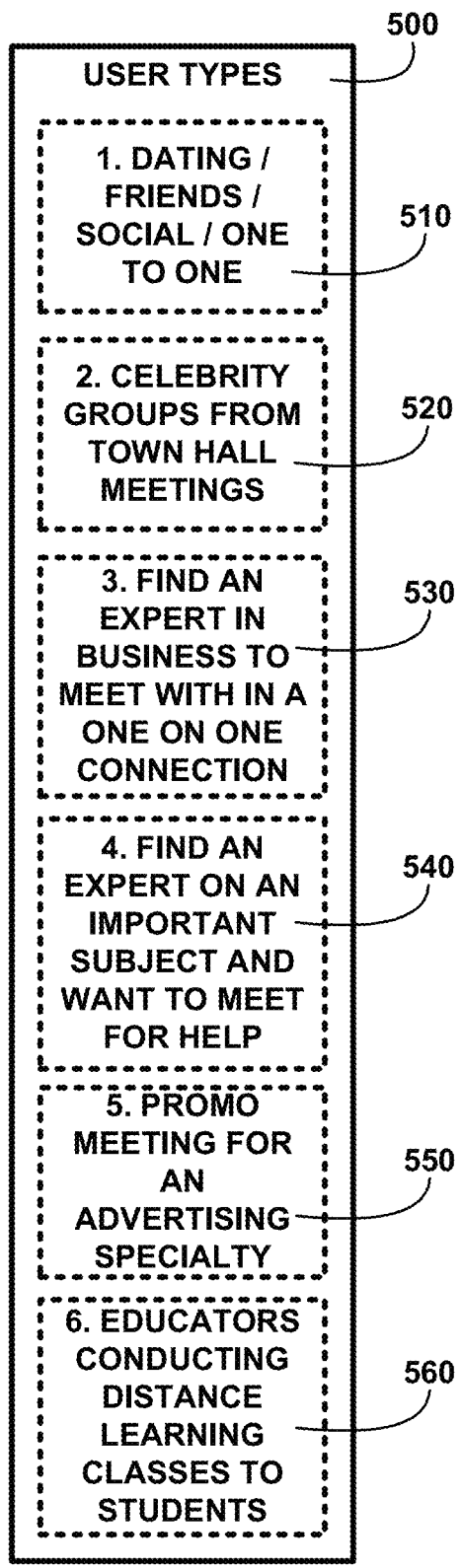
FIG. 5 shows a block diagram of an overview of user types of one embodiment.

User types:

FIG. 5 shows a block diagram of an overview of user types of one embodiment. FIG. 5 shows examples of user types 500 who use the live time connection application 110 of FIG. 1 including 1. Dating/friends/social/one to one 510; 2. Celebrity groups from town hall meetings 520; 3. Users wanting to find an expert in business to meet with in a one on one connection 530; 4. Users wanting to find an expert on an important subject and want to meet for help 540; and 5. Promo meeting for an advertising specialty 550; and 6. Educators conducting distance learning classes to students 560 of one embodiment.

Figure 6:
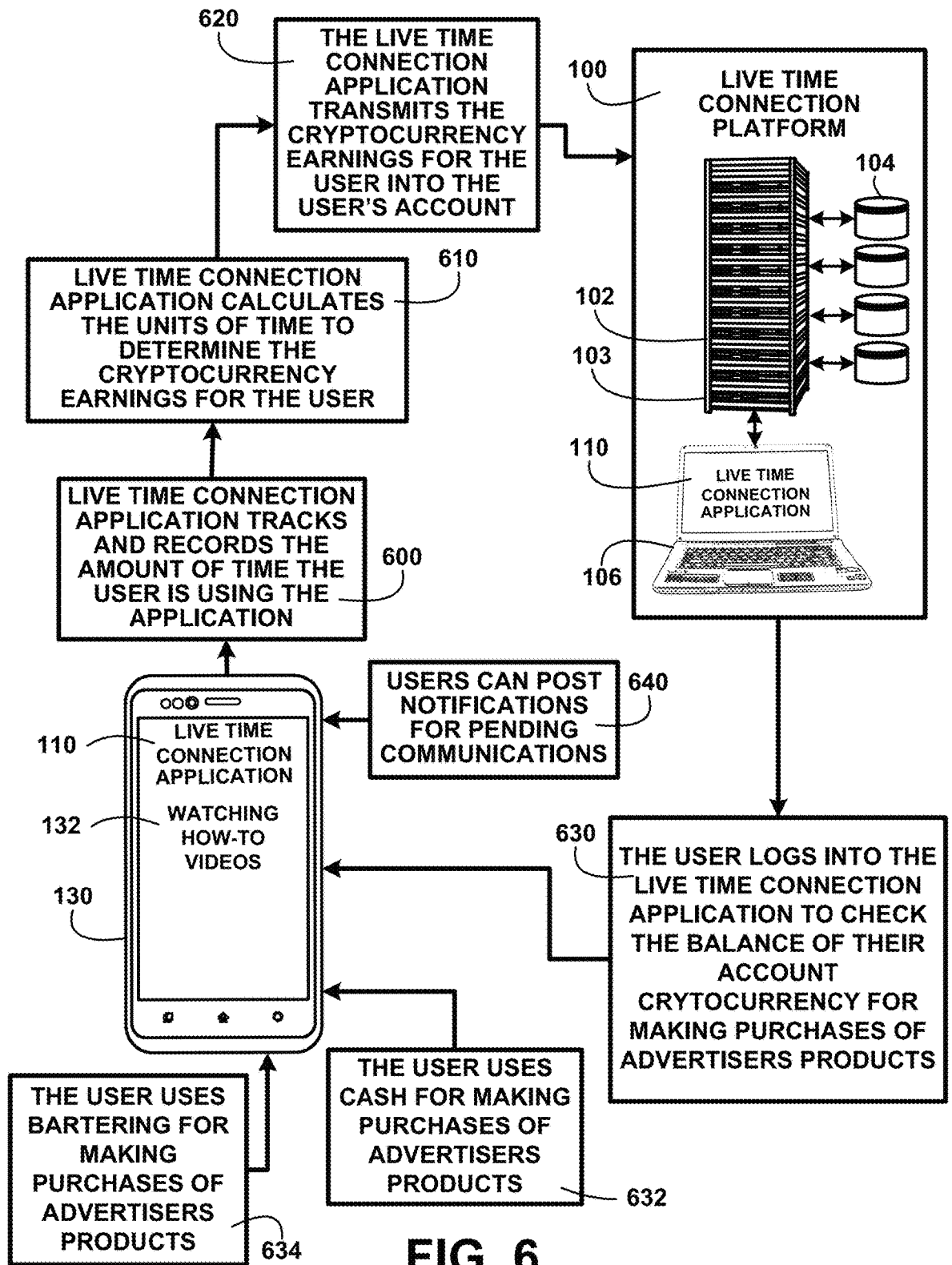
FIG. 6 shows for illustrative purposes only an example of cryptocurrency for making purchases of advertiser's products of one embodiment.

Cryptocurrency for making purchases of advertiser's products:

FIG. 6 shows for illustrative purposes only an example of cryptocurrency for making purchases of advertiser's products of one embodiment. FIG. 6 shows the live time connection platform 100 with at least one digital server 102, the live time connection website 103, a plurality of databases 104, the live time connection platform computer 106 with the live time connection application 110. The user logs into the live time connection application to check the balance of their account cryptocurrency for making purchases of advertiser's products 630. The user uses cash for making purchases of advertiser's products 632. The user uses bartering for making purchases of advertiser's products 634. Users earning cryptocurrency includes the initiator of the contact as well as the listener/receiver/audience/participant. Users can post notifications for pending communications 640. Examples of notifications for pending communications include "The president is holding a state of the union address Wed. at 3 pm", "Yoga instructor calling all fitness buffs Thur. at 2 pm", and "Famous actor will be holding a town hall for his followers/fans/friends in 10 minutes!"

The user phone 130 with the live time connection application 110 is used for watching how-to videos 132. Users can post notifications for pending communications 640.

The live time connection application tracks and records the amount of time the user is using the application 600. The live time connection application calculates the units of time to determine the cryptocurrency earnings for the user 610. The live time connection application transmits the cryptocurrency earnings for the user into the user's account 620 stored on the live time connection platform 100 of one embodiment.

Figure 7:
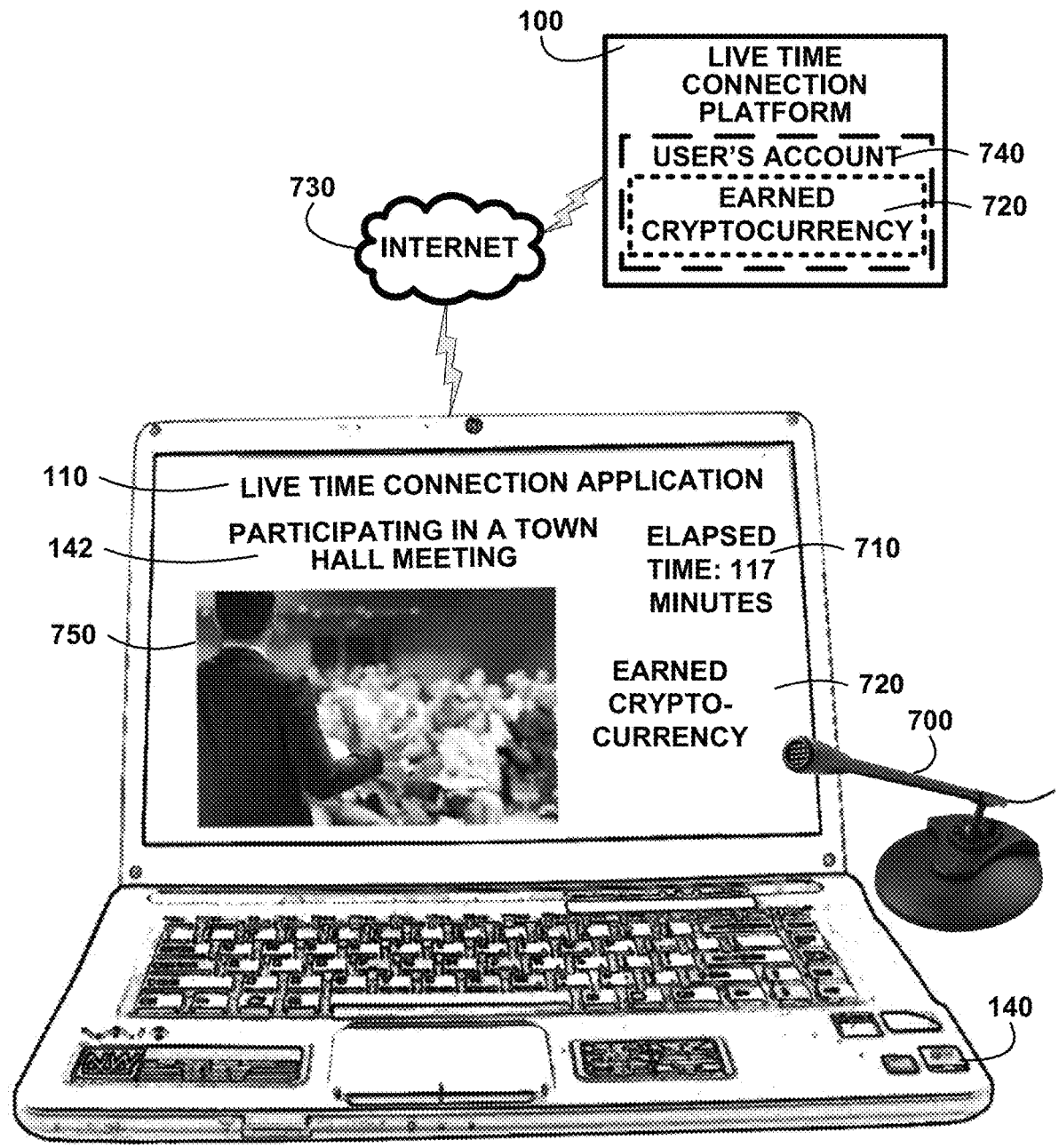
FIG. 7 shows for illustrative purposes only an example of participating in a town hall meeting of one embodiment.

Participating in a town hall meeting:

FIG. 7 shows for illustrative purposes only an example of participating in a town hall meeting of one embodiment. FIG. 7 shows the user laptop computer 140 with the live time connection application 110 for participating in a town hall meeting 142. The town hall meeting broadcast is displayed 750 on the user laptop computer 140 and a user's microphone is used for making comments in the town hall meeting 700. The live time connection application 110 tracks the elapsed time: 117 minutes 710 used for calculating earned cryptocurrency 720 using an adjustable unit of time per quantity of cryptocurrency. The live time connection application transmits the user elapsed time and earned cryptocurrency over the internet 730 to the live time connection platform 100 for recording into the user's account 740 the user's earned cryptocurrency 720. Users earning cryptocurrency includes the initiator of the contact as well as the listener/receiver/audience/connected participant of one embodiment.

Figure 8:
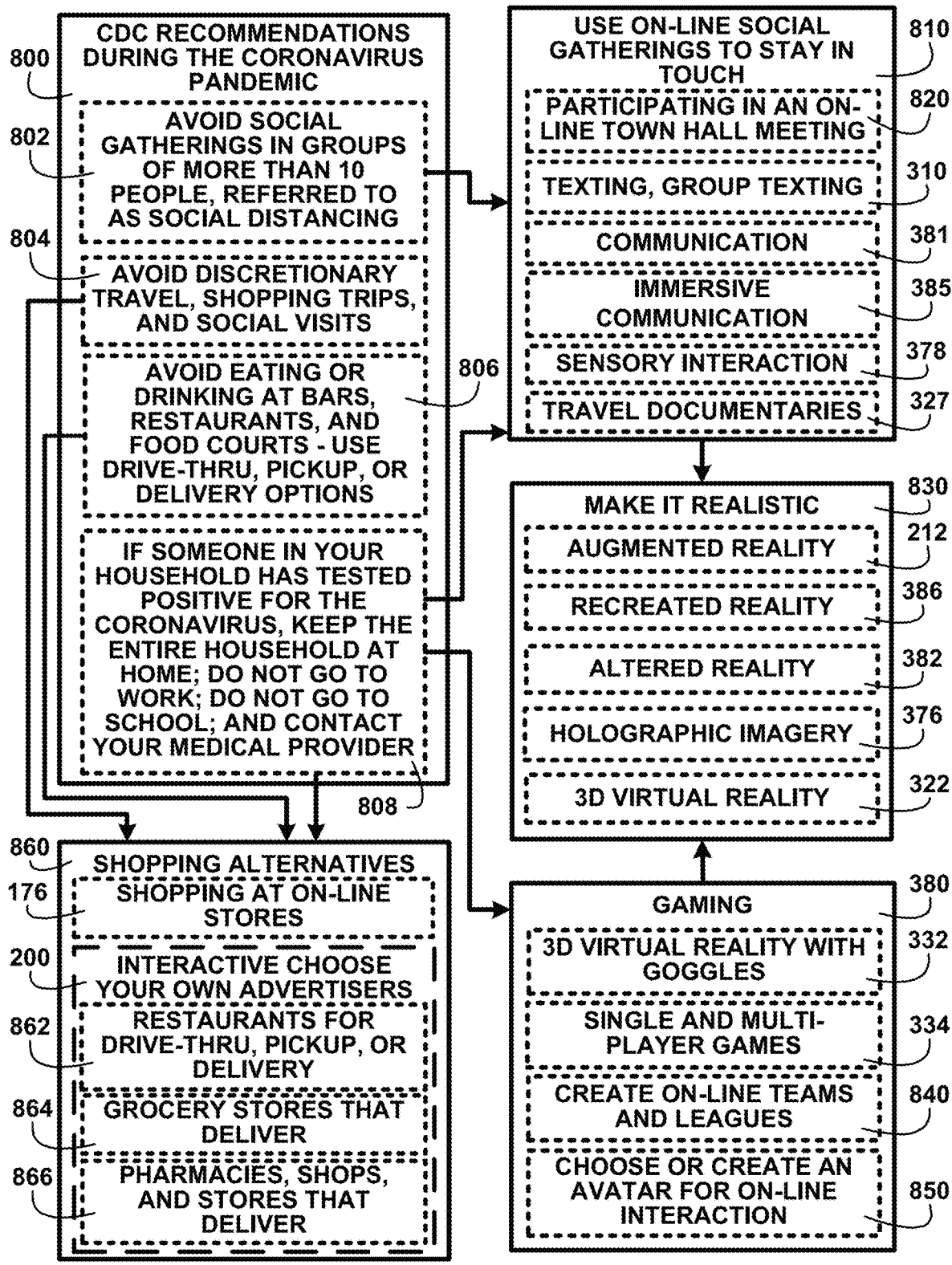
FIG. 8 shows a block diagram of an overview of social distancing of one embodiment.

Social distancing:

FIG. 8 shows a block diagram of an overview of social distancing of one embodiment. FIG. 8 shows CDC recommendations during the coronavirus pandemic 800 that include avoid social gatherings in groups of more than 10 people, referred to as social distancing 802. Also avoid discretionary travel, shopping trips, and social visits 804 and avoid eating or drinking at bars, restaurants, and food courts—use drive-thru, pickup, or delivery options 806. If someone in your household has tested positive for the coronavirus, keep the entire household at home; do not go to work; do not go to school and contact your medical provider 808. One way to avoid social gatherings in groups of more than 10 people, referred to as social distancing 802 is to use on-line social gatherings to stay in touch 810. The live time connection application 110 of FIG. 1 provides the method of participating in an on-line town hall meeting 820, texting, group texting 310, communication 381, immersive communication 385, and sensory interaction 378, and travel documentaries 327. The live time connection application 110 of FIG. 1 lets a user experience on-line travel, shopping trips, and social visits and makes it realistic 830. The live time connection application 110 of FIG. 1 uses augmented reality 212, recreated reality 386, altered reality 382, holographic imagery 376, and 3D virtual reality 322 to put the user and their friends and family into the experience. The live time connection application 110 of FIG. 1 provides the way you and your friends and family can earn cryptocurrency while enjoying on-line social gatherings.

To avoid discretionary travel, shopping trips, and social visits 804 the live time connection application 110 of FIG. 1 provides shopping alternatives 860. A user can spend their earned cryptocurrency for shopping at on-line stores 176. The user can interactive choose your own advertisers 200 including restaurants for drive-thru, pickup, or delivery 862, grocery stores that deliver 864, and pharmacies, shops, and stores that deliver 866.

CDC recommends avoid eating or drinking at bars, restaurants, and food courts—use drive-thru, pickup, or delivery options 806. The live time connection application 110 of FIG. 1 provides shopping alternatives 860.

If someone in your household has tested positive for the coronavirus, keep the entire household at home; do not go to work; do not go to school and contact your medical provider 808. The live time connection application 110 of FIG. 1 provides shopping alternatives 860. The live time connection application 110 of FIG. 1 will help the members of the user's household stay occupied and having fun using the gaming 380 while earning more cryptocurrency. Gaming 380 with 3D virtual reality with goggles 332 will makes it realistic 830. Gaming 380 for single and multi-player games 334 and create on-line teams and leagues 840 with neighbor and distant friends. Household members can choose or create an avatar for on-line interaction 850 of one embodiment.

Figure 9:
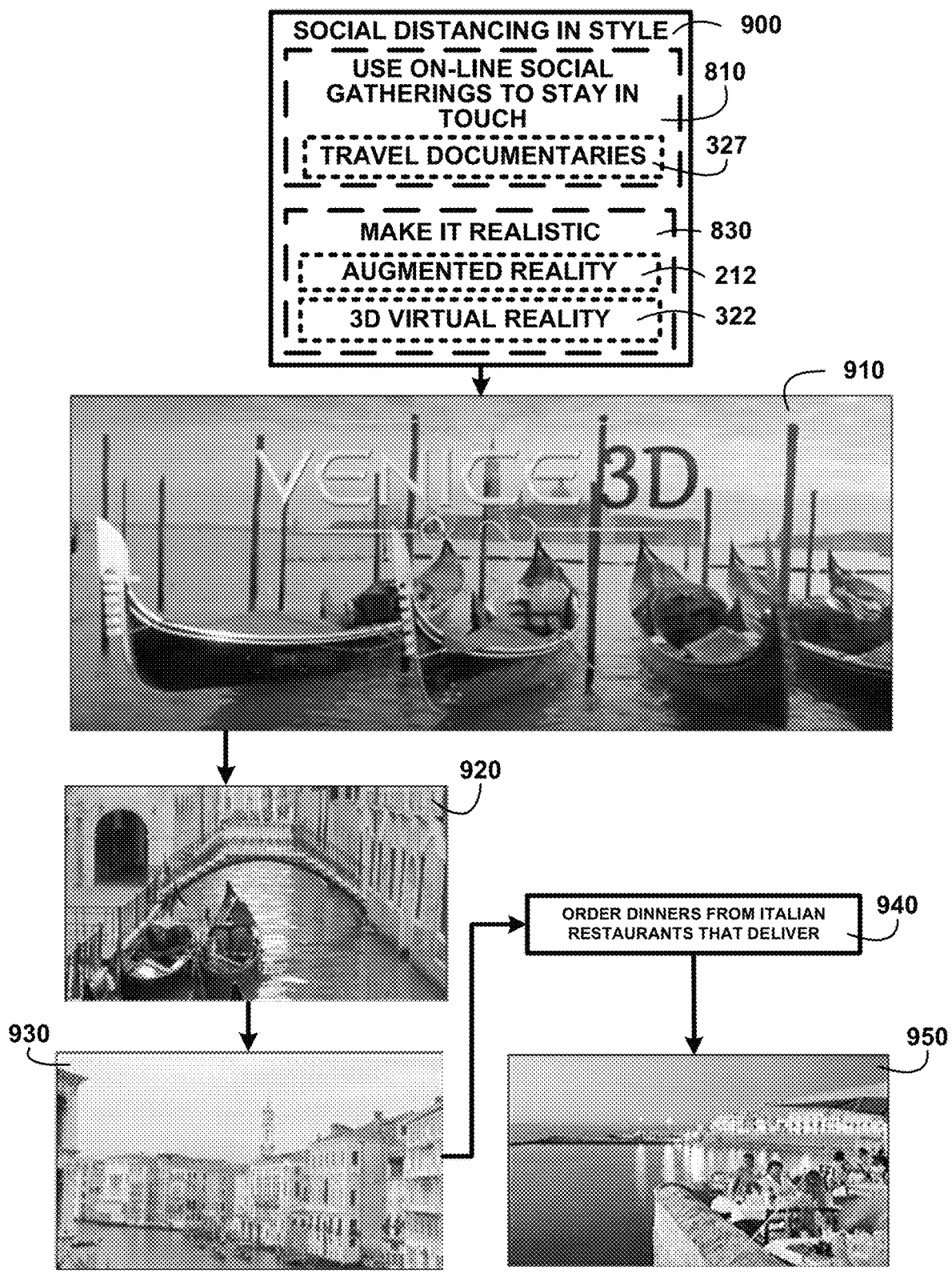
FIG. 9 shows for illustrative purposes only an example of social distancing in style of one embodiment.

Social distancing in style:

FIG. 9 shows for illustrative purposes only an example of social distancing in style of one embodiment. FIG. 9 shows an example of social distancing in style 900. Social distancing in style 900 is one way to use on-line social gatherings to stay in touch 810. Invite your friends and family to join you in travel documentaries 327. Makes it realistic 830 using augmented reality 212 and 3D virtual reality 322. Group view a 3D travel documentary for example Venice 3D 910 to tour the canals in a gondola 920. Cruise the water ways to view the centuries old architecture 930. To add to the experience order dinners from Italian restaurants that deliver 940. Virtually dine with your friends and family while enjoying the views of Venice 950. Social distancing in style creates a fun night-out experience, breaks the non-physical contact routine and will help stimulate the economy particularly for restaurants on one embodiment.

Figure 10:
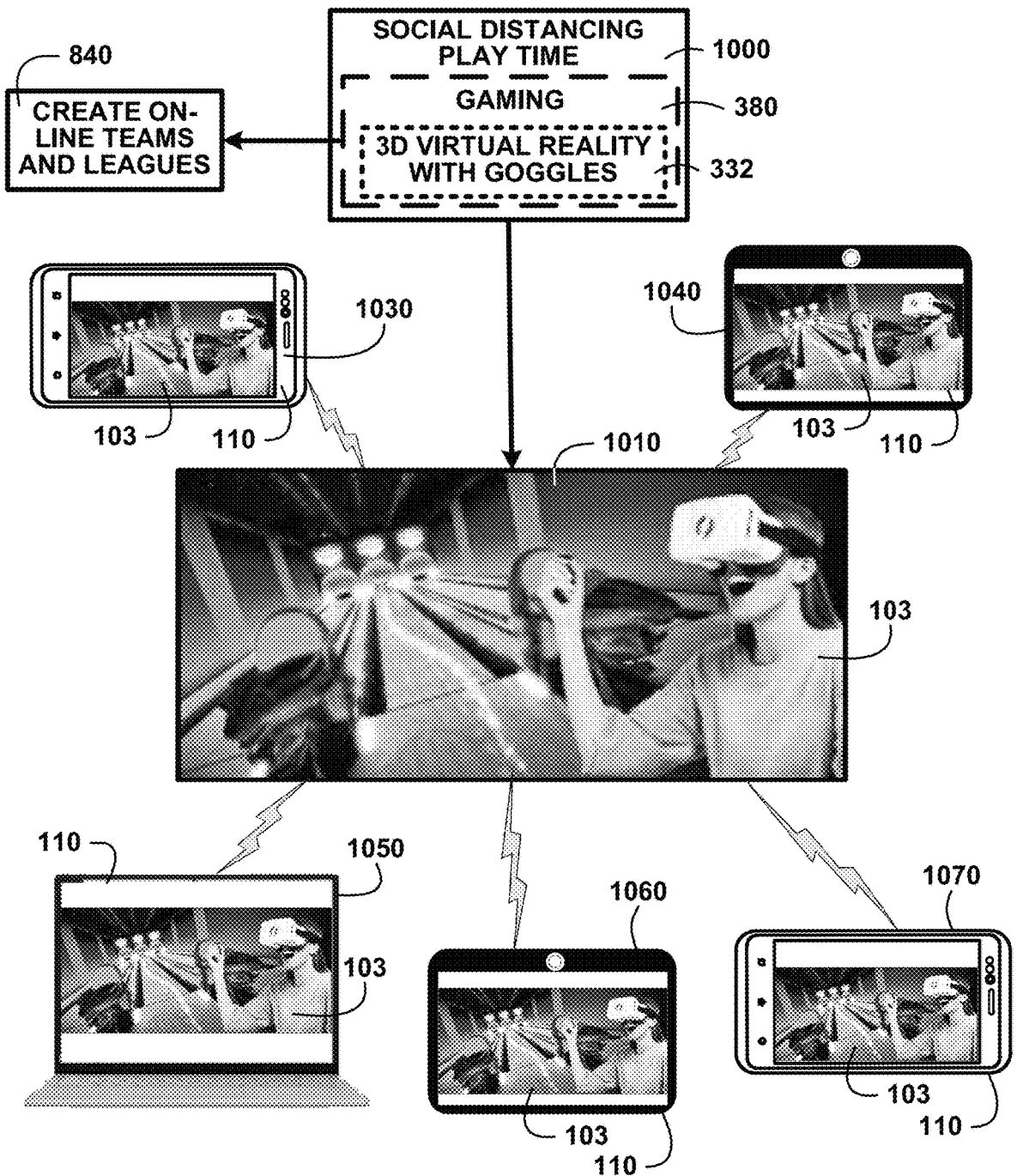
FIG. 10 shows for illustrative purposes only an example of social distancing play time of one embodiment.

Social distancing play time:

FIG. 10 shows for illustrative purposes only an example of social distancing play time of one embodiment. FIG. 10 shows social distancing play time 1000 is available through the live time connection application 110 gaming 380. The live time connection application 110 with 3D virtual reality with goggles 332 is used for example for playing a VR bowling program available from live time connection website 1010. Social distancing can be accomplished by creating on-line teams and leagues 840 among friends and family. The live time connection website 103 is in this example logged into by a first on-line player 1030, second on-line player 1040, third on-line player 1050, fourth on-line player 1060, and fifth on-line player 1070 for playing VR bowling of one embodiment.

Figure 11A:
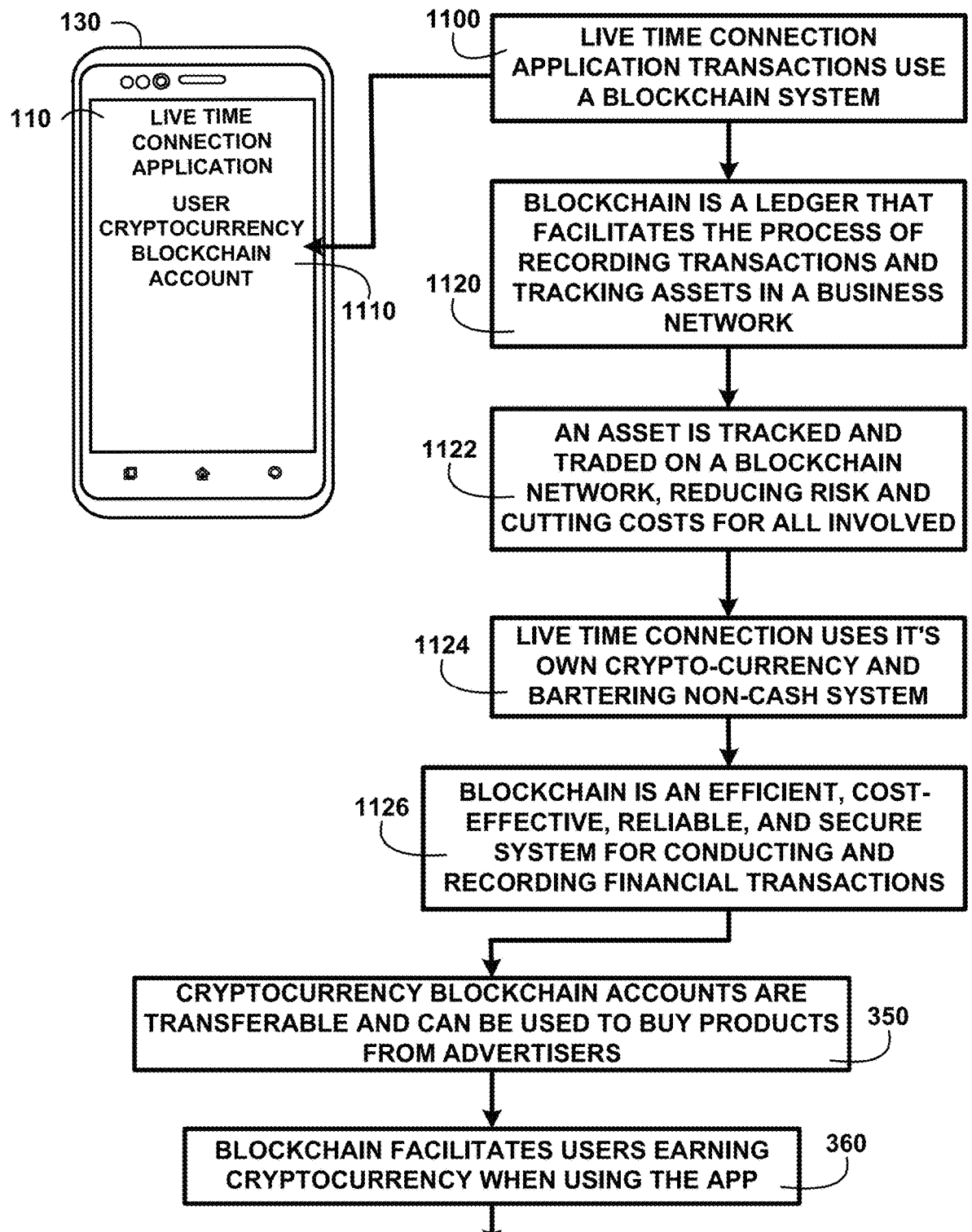
FIG. 11A shows for illustrative purposes only an example of crypto-currency and bartering non-cash system of one embodiment.

Crypto-currency and bartering non-cash system:

FIG. 11A shows for illustrative purposes only an example of crypto-currency and bartering non-cash system of one embodiment. FIG. 11A shows the live time connection application 110 installed on the user phone 130. Live time connection application transactions use a blockchain system 1100. The blockchain system creates a user cryptocurrency blockchain account 1110 to deposit and withdraw cryptocurrency earned by the user for the time spent using the live time connection application 110. Blockchain is a ledger that facilitates the process of recording transactions and tracking assets in a business network 1120. The use of cryptocurrency is not intended for replacing money or circumventing federal mandates and taxation.

In the blockchain system an asset is tracked and traded on a blockchain network, reducing risk and cutting costs for all involved 1122. The live time connection uses its own cryptocurrency and bartering non-cash system 1124 for paying users and for user purchases of advertiser's products. Blockchain is an efficient, cost-effective, reliable, and secure system for conducting and recording financial transactions 1126. For example cryptocurrency blockchain accounts are transferable and can be used to buy products from advertisers 350. Blockchain facilitates users earning cryptocurrency when using the app 360. Additional blockchain descriptions continue on FIG. 11B of one embodiment.

Figure 11B:
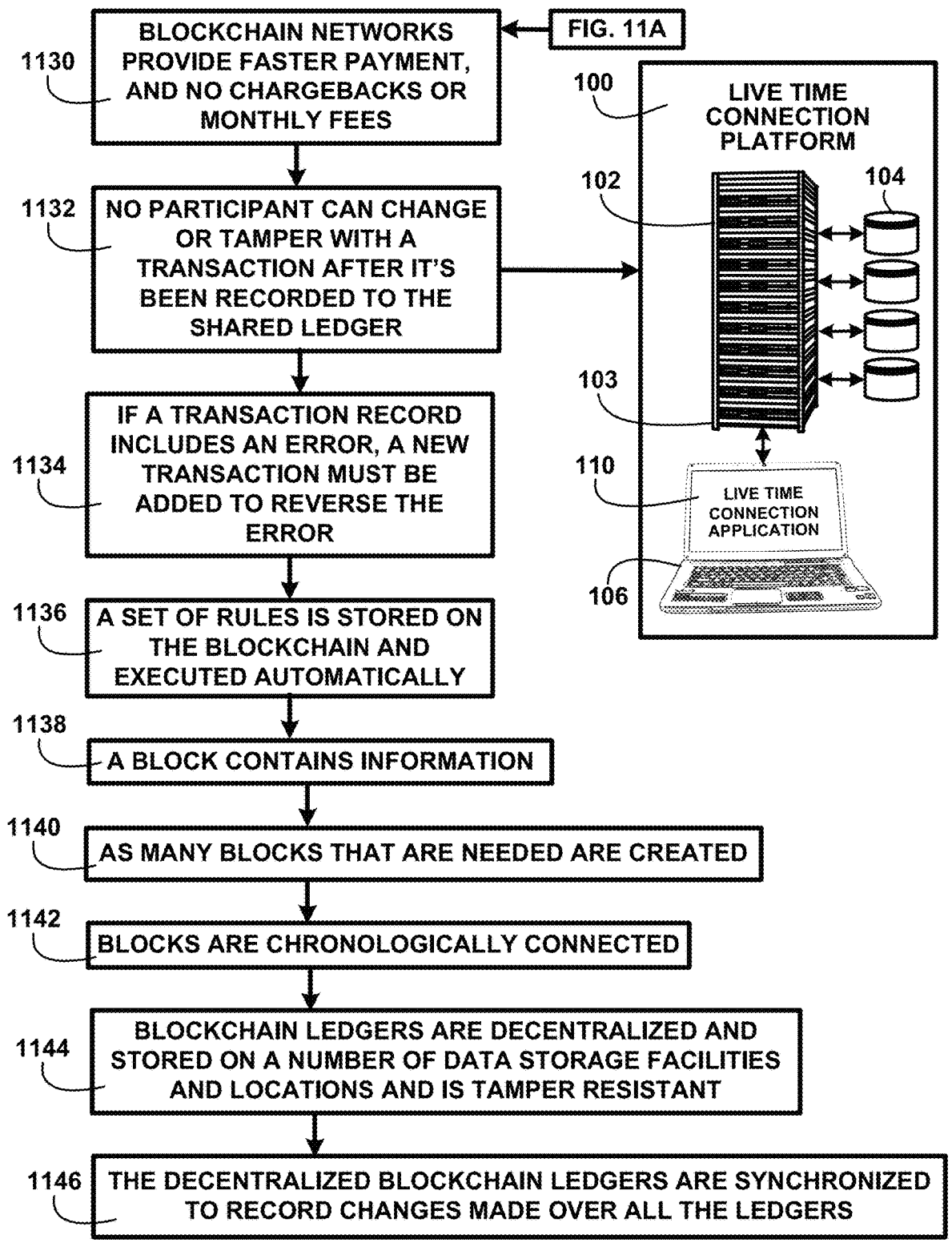
FIG. 11B shows for illustrative purposes only an example of blockchain transactions of one embodiment.

Blockchain transactions:

FIG. 11B shows for illustrative purposes only an example of blockchain transactions of one embodiment. FIG. 11B shows a continuation from FIG. 11A blockchain networks provide faster payment, and no chargebacks or monthly fees 1130. The transactions are safe as no participant can change or tamper with a transaction after it's been recorded to the shared ledger 1132. The live time connection blockchain transactions are first recorded on the live time connection platform 100. The live time connection platform 100 includes at least one digital server 102, a live time connection website 103, and a plurality of databases 104, a live time connection platform computer 106 with the live time connection application 110.

If a blockchain transaction record includes an error, a new transaction must be added to reverse the error 1134. A set of rules is stored on the blockchain and executed automatically 1136. A block contains information 1138 and a blockchain is made up of as many blocks that are needed are created 1140. The order of the block creation is maintained as blocks are chronologically connected 1142. Blockchain ledgers are decentralized and stored on a number of data storage facilities and locations and is tamper resistant 1144. The decentralized blockchain ledgers are synchronized to record changes made to it over all the ledgers 1146 of one embodiment.

Figure 12A:
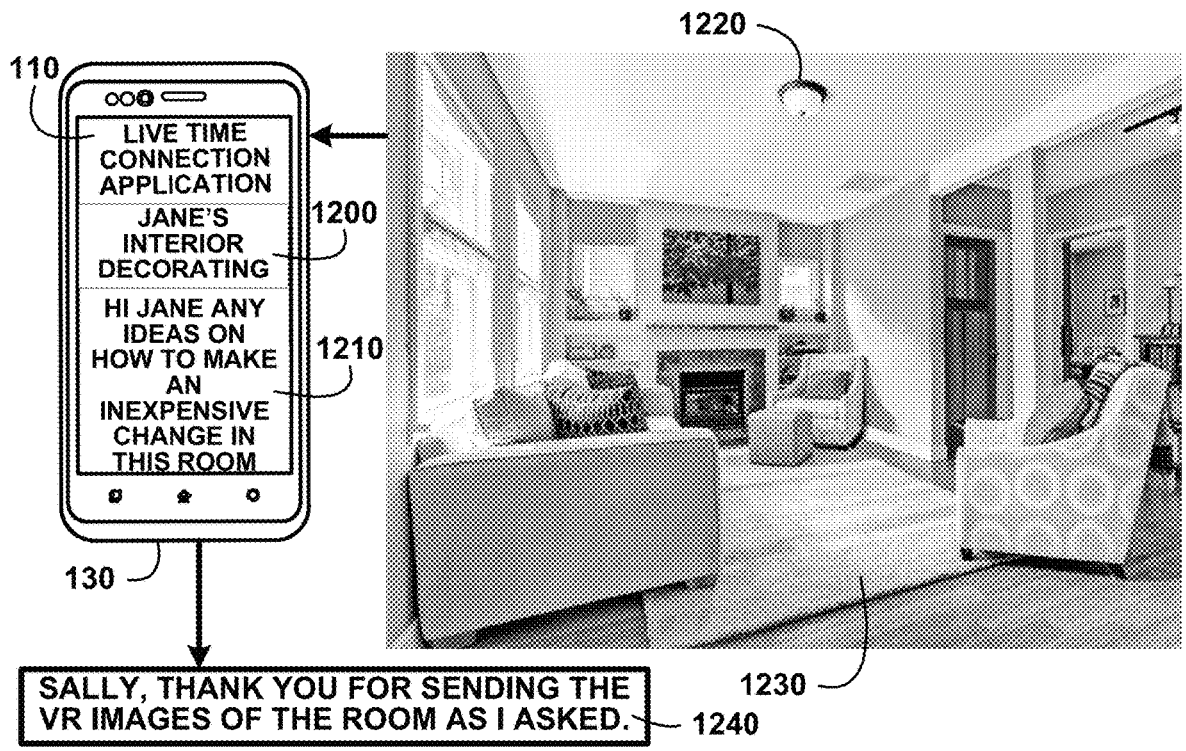
FIG. 12A shows for illustrative purposes only an example of conducting business transactions remotely of one embodiment.

Conducting business transactions remotely:

FIG. 12A shows for illustrative purposes only an example of conducting business transactions remotely of one embodiment. FIG. 12A shows the live time connection application 110 on a user phone 130, in this example Jane's interior decorating 1200. Jane's interior decorating 1200 does business on-line outside its local area using augmented, virtual and mixed reality (MR). In this example the customer is several states away. The customer writes "Hi Jane, any ideas on how to make an inexpensive change in this room?" 1210. The customer has sent a connection to VR images of a room with a ceiling light 1220. The VR images of the room include a view of the carpet 1230. Jane replies to the customer, "Sally, thank you for sending the VR images of the room as I asked." 1240 of one embodiment.

Figure 12B:
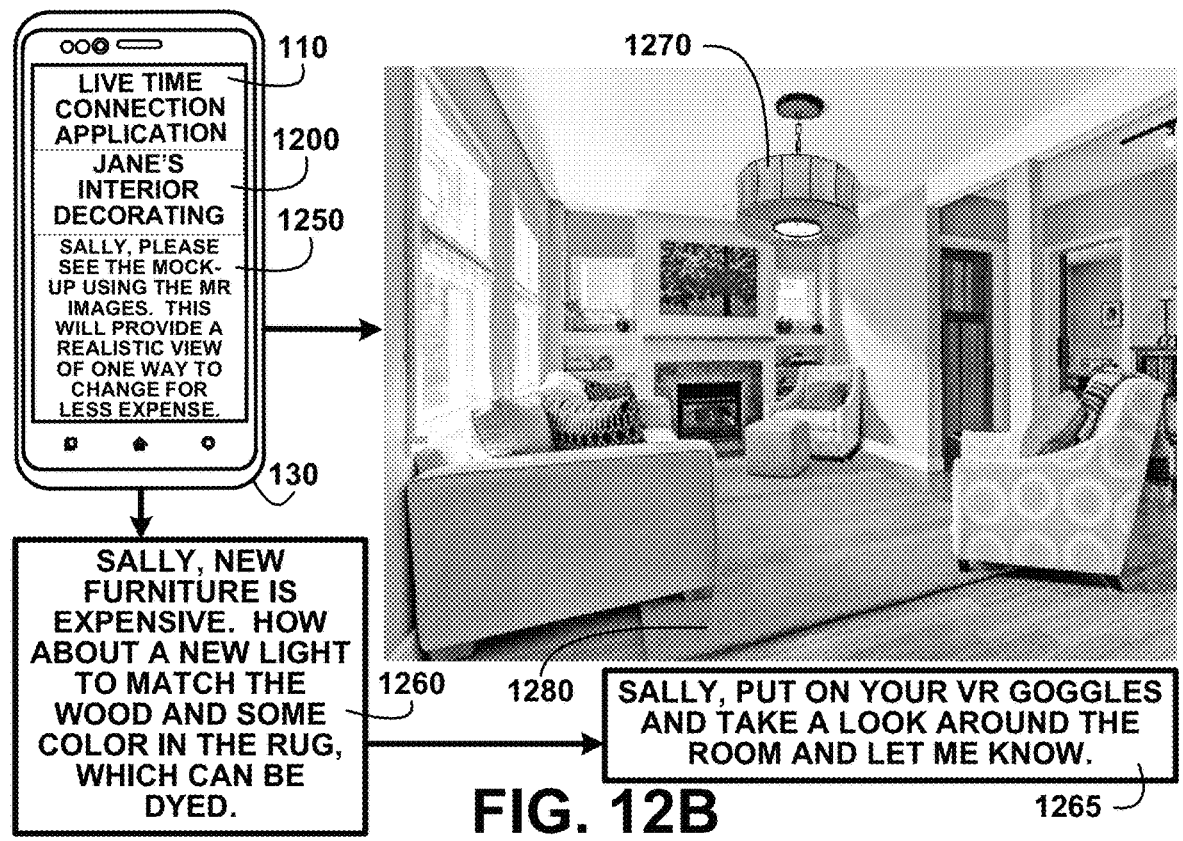
FIG. 12B shows for illustrative purposes only an example of virtual reality use for business of one embodiment.

Virtual reality use for business:

FIG. 12B shows for illustrative purposes only an example of virtual reality use for business of one embodiment. FIG. 12B shows the live time connection application 110 on the user phone 130. Jane's interior decorating 1200 sends to the customer a mixed reality image of the same room where the ceiling light has been changed and the carpet dyed a different color. Jane from Jane's interior decorating advises her customer, "Sally, please see the mock-up using the MR images. This will provide a realistic view of one way to change for less expense." 1250.

Jane further advises her customer, "Sally, new furniture is expensive. How about a new light to match the wood and some color in the rug, which can be dyed." 1260. The MR image of a proposed new ceiling light 1270 and MR image of a proposed new carpet color 1280 are transmitted to the customer. Jane asks her customer, "Sally, put on your VR headset and take a look around the room and let me know." 1265. Jane is successful in performing her interior decorating design work and will advise her customer where Jane can purchase the lamp with Jane's fee included and where the carpet can be dyed with a mark-up fee for Jane of one embodiment.

Figure 13:
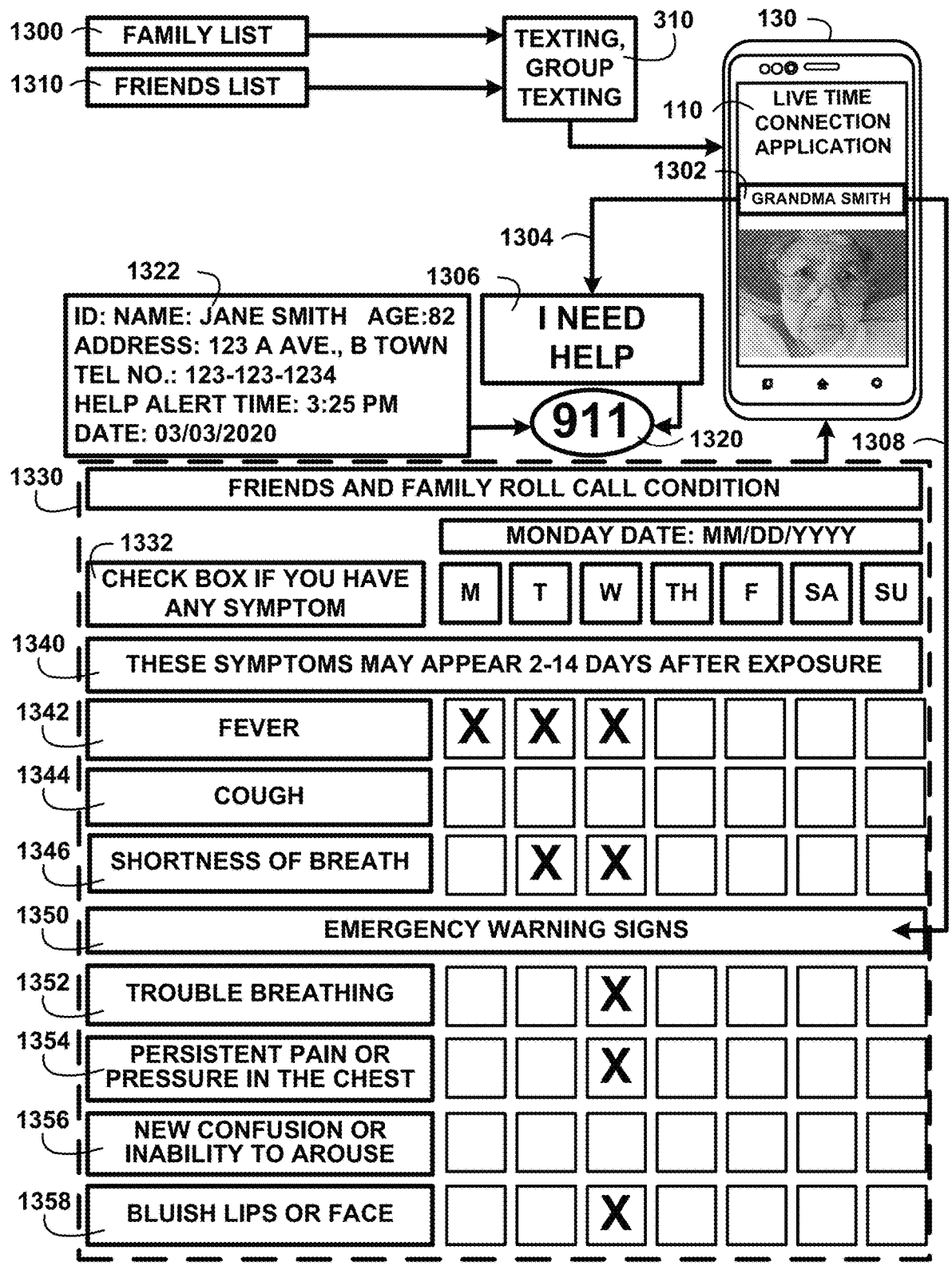
FIG. 13 shows for illustrative purposes only an example of friends and family roll call condition of one embodiment.

Friends and family roll call condition:

FIG. 13 shows for illustrative purposes only an example of friends and family roll call condition of one embodiment. FIG. 13 shows a family list 1300 and a friends list 1310 for contacts of the user to check on their health conditions during the COVID-19 pandemic. The two lists are setup for automatic texting, group texting 310 using the live time connection application 110 on the user phone 130. The text message sent out daily is part of a friends and family roll call condition 1330 to keep in close contact during the social distancing period. One of the people on the family list 1300 is Grandma Smith 1302. Grandma Smith 1302 is elderly and has other health conditions which put her in the high risk group for infection of the coronavirus.

An audible alert and visual alert emergency alert notification is produced by the live time connection application 110 on the user phone 130 when Grandma Smith's response to condition check text 1304 is "I need help" 1306. Grandma Smith had checked emergency warning signs 1308 from the list of CDC symptoms. The user relative calls 911 1320 in response to the emergency alert notification. The user relative provides 911 with Grandma Smith's ID information and address from the records stored in the family list 1300 on the live time connection application 110. The stored information 1322 includes ID: Name: Jane Smith; Age: 82; Address: 123 A Ave., B Town; Tel no.: 123-123-1234. The user relative also provides 911 with the Help Alert Time: 3:25 pm and Date: Mar. 5, 2020. The VR image of Grandma Smith shows one of the emergency warning signs 1308 bluish lips or face 1358.

The past few days shows the responses from Grandma Smith which indicate she started showing symptoms on Monday. Her responses to the friends and family roll call condition 1330 texting for the week of Monday date: 03/03/2020 indicate her condition has become critical. The responses for the days of the week M, T, W, Th, F, Sa, and Su show her checks for the instruction to check box if you have any symptom 1332. It explains these symptoms may appear 2-14 days after exposure 1340. For the fever 1342 symptom Grandma Smith had checked M, T, and W. She indicated no cough 1344, but for shortness of breath 1346 Grandma Smith had checked T and W. On Wednesday for the emergency warning signs 1350 Grandma Smith checked trouble breathing 1352, persistent pain or pressure in the chest 1354, no new confusion or inability to arouse 1356, but additionally bluish lips or face 1358 automatically triggers the emergency alert notification. The live time connection application 110 features provided a cadre of tools to keep track of the condition of the user's family members and friends of one embodiment.

Figure 14:
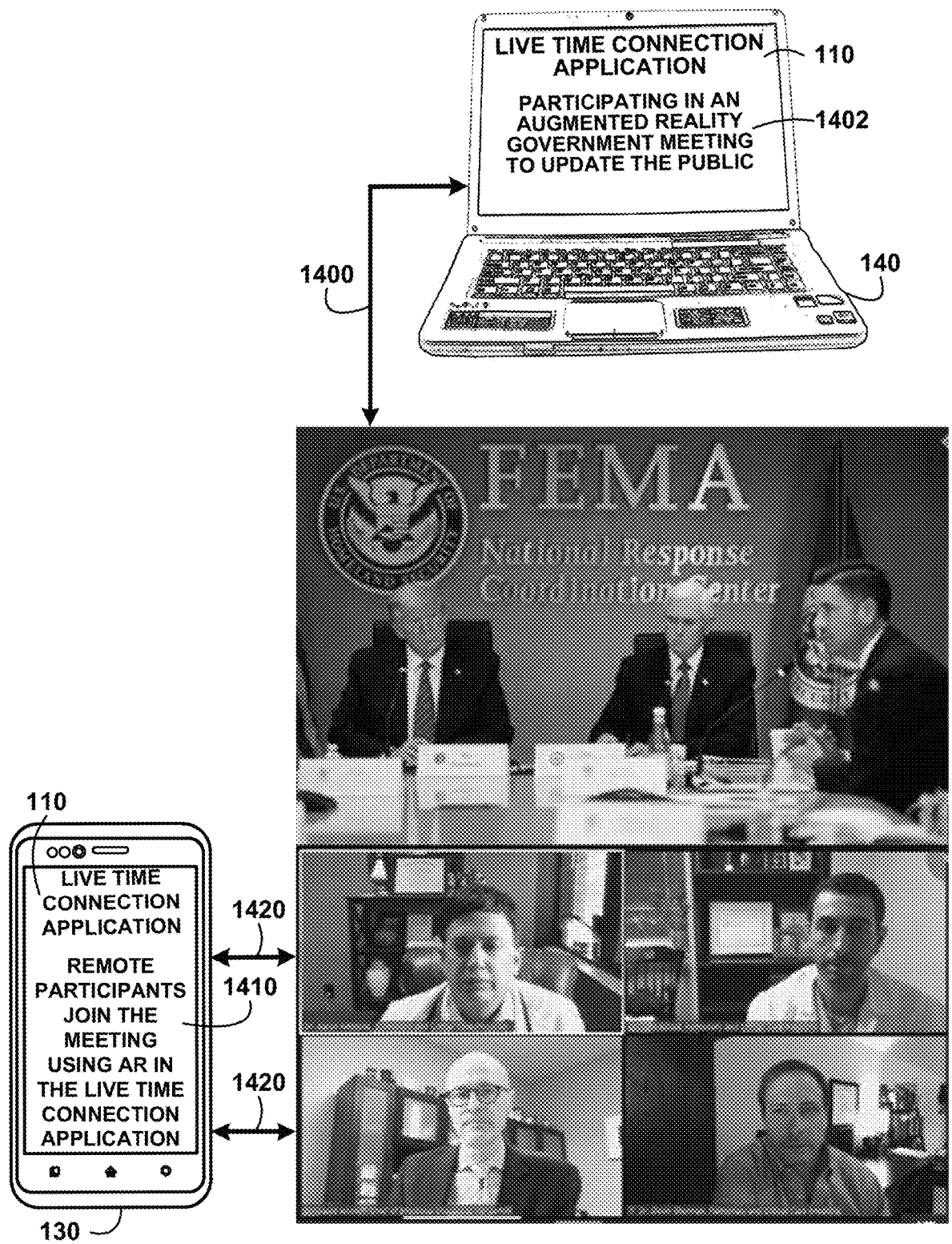
FIG. 14 shows for illustrative purposes only an example of government gatherings and updating of one embodiment.

Government gatherings and updating:

FIG. 14 shows for illustrative purposes only an example of government gatherings and updating of one embodiment.

FIG. 14 shows the live time connection application 110 on a user laptop computer 140. The live time connection application 110 is providing the means for participating in an augmented reality government meeting to update the public 1402. During these times of social distancing, even government meetings work at keeping the number of persons gathering for a meeting to a minimum. In this example the live time connection application 110 on a plurality of user phone 130 installations permits remote participants to join the meeting. Remote participants join the meeting using AR in the live time connection application 1410. Each person remotely participating uses their own phone to join the augmented reality government meeting 1420 of one embodiment.

Figure 15:
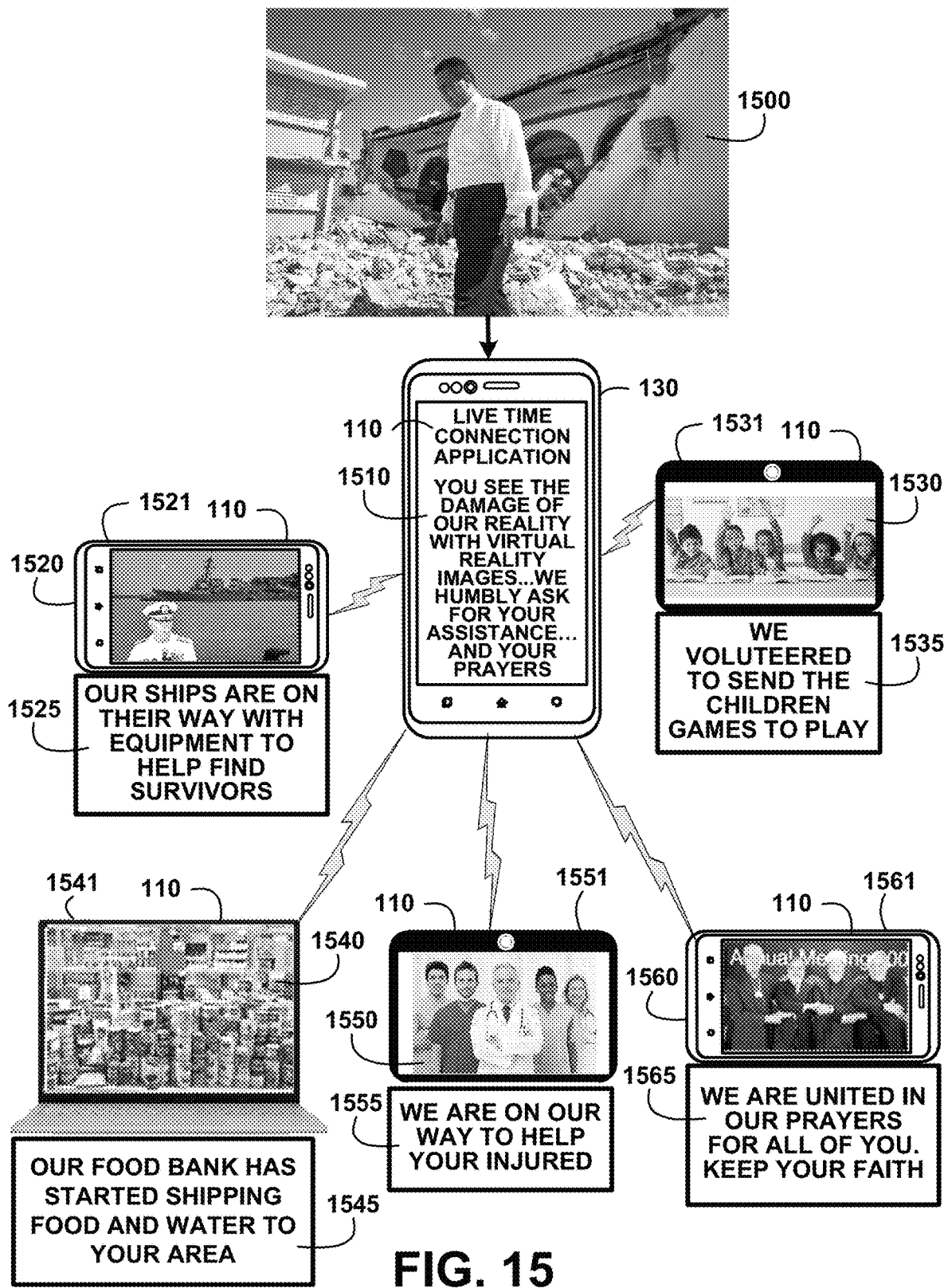
FIG. 15 shows for illustrative purposes only an example of emergency social network of one embodiment.

Emergency social network:

FIG. 15 shows for illustrative purposes only an example of emergency social network of one embodiment. FIG. 15 shows an official walking the site of an earthquake 1500. The official uses the live time connection application 110 on his user phone 130 to communicate to a large contingent of people his message, "You see the damage of our reality with virtual reality images . . . . We humbly ask for your assistance . . . and your prayers." 1510. The official begins to receive quickly a number of replies from others using the live time connection application 110. From an Admiral's phone 1521 with the live time connection application 110 the official receives this message from a U.S. Navy Admiral 1520, "Our ships are on their way with equipment to help find survivors" 1525. The message includes a VR image of two ships.

Another message comes from a teacher's tablet 1531 with the live time connection application 110. The VR image sent with the message of elementary students 1530 with their hands raised for volunteering. The message is from the elementary students 1530 "We volunteered to send the children games to play" 1535. The social aspect of the earthquake disaster is not lost on the elementary students 1530 who realize the children in the disaster area are still children and the games will be a good diversion during these tough conditions.

A food bank worker's laptop computer 1541 with the live time connection application 110 shows an AR image of food bank food supplies 1540. The accompanying message relays the news that "Our food bank has started shipping food and water to your area" 1545. This was welcomed news for the official as food and water has been in short supply.

The live time connection application 110 on a Doctor's tablet 1551 carried much needed news of the Doctor and Nurses 1550 shown in a VR image. The Doctor and Nurses 1550 tell the official "We are on our way to help your injured" 1555. Additional medical personnel providing medical attention to the injured will ease their suffering and may save lives in the wake of the disaster.

The official's request "You see the damage of our reality with virtual reality images . . . We humbly ask for your assistance . . . and your prayers." 1510 prompted an unusual response from a clergyman's phone 1561 with the live time connection application 110. A group of clergymen of different faiths 1560 shown in the VR image with the message attached. This group of clergymen of different faiths 1560 joined together to express their compassion and concern with their message "We are united in our prayers for all of you. Keep your faith." 1565. The live time connection application 110 provided the vehicle for this emergency social network to quickly gather resources and efforts to help others in their time of need. The VR and AR images of the enthusiastic smiles transmit the unspoken message that you are not alone and we are here with you to help of one embodiment.

Figure 16:
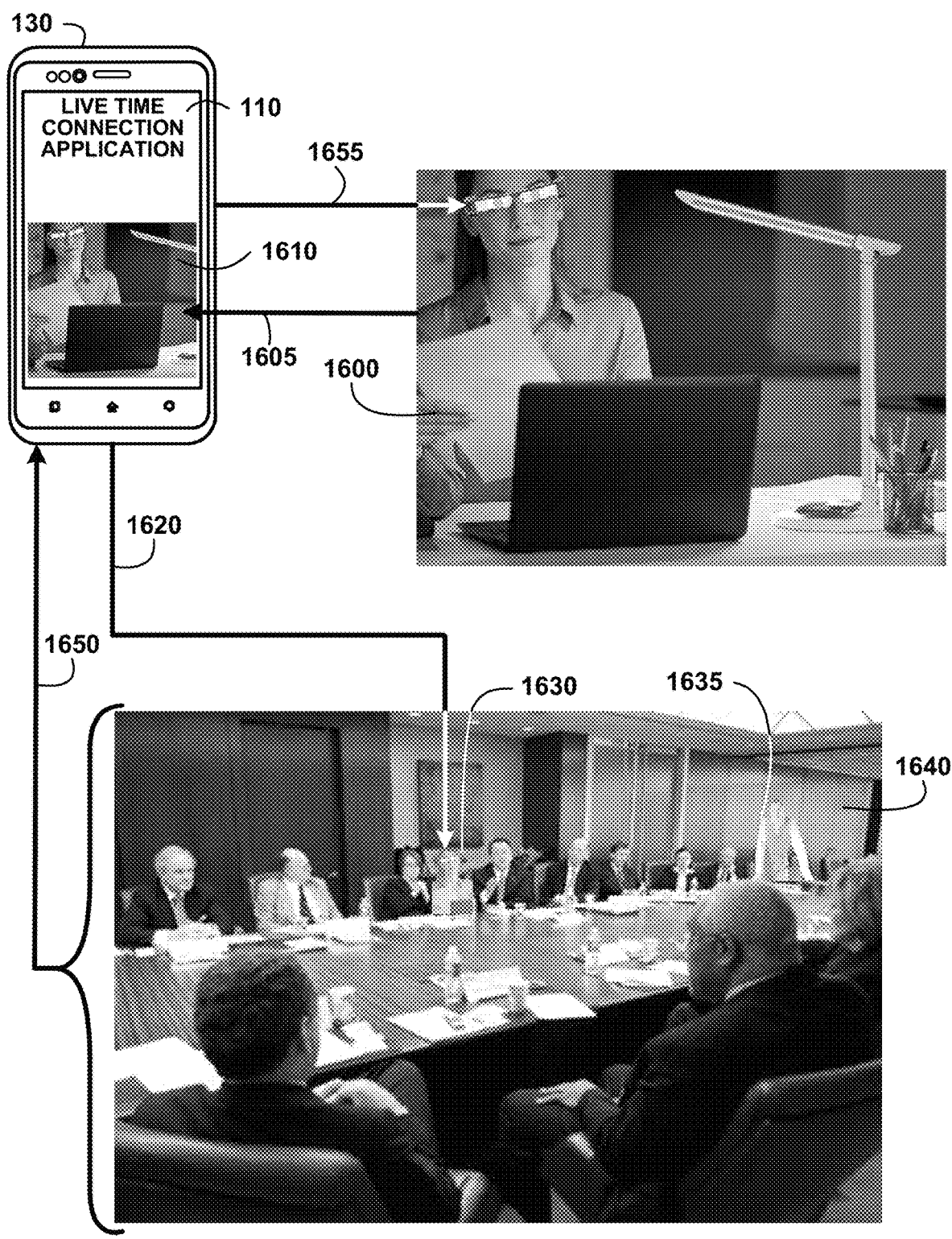
FIG. 16 shows for illustrative purposes only an example of corporate work from home—telecommuting of one embodiment.

Corporate work from home–telecommuting:

FIG. 16 shows for illustrative purposes only an example of corporate work from home—telecommuting of one embodiment. FIG. 16 shows the live time connection application 110 being used on a user phone 130 for telecommuting. The user is a remote corporate officer at her remote office attending an AR board meeting wearing AR glasses 1600. Telecommuting saves a great deal of travel time that can be put to better productive efforts. Eliminating travel and hotel expenses can produce a significant economic savings for a company. Another benefit is eliminating the physical wear and tear on the personnel traveling from remote locations. In this example the AR image and communications from the remote corporate officer are transmitted to the board meeting location using the live time connection application 1605.

The AR image being transmitted 1610 puts the remote corporate office into the board room as though she was physically attending the meeting. The transmitted AR image signal is received in a holographic format in the board room 1620. The board meeting attendees in the room can see and hear the remote corporate office like she was sitting across the table from themselves. The remote corporate officer seen sitting at the table in a holographic image 1630 using the live time connection application 110 reality features clearly sees and hears the other attendees as well as if she were in the room. Another remote board meeting attendee is showing in the board room holographic display 1635 who is also taking advantage of telecommuting.

The board meeting room 1640 also has installed AR cameras capturing board room meeting AR images and signals are transmitted to the remote corporate officer's phone 1650. The board room meeting AR images and signal transmitted to the remote corporate officer's phone are relayed to the AR glasses 1655 being worn. This provides the connection with her fellow corporate officers and relieves the inconvenience of the remote situation of one embodiment.

Figure 17:
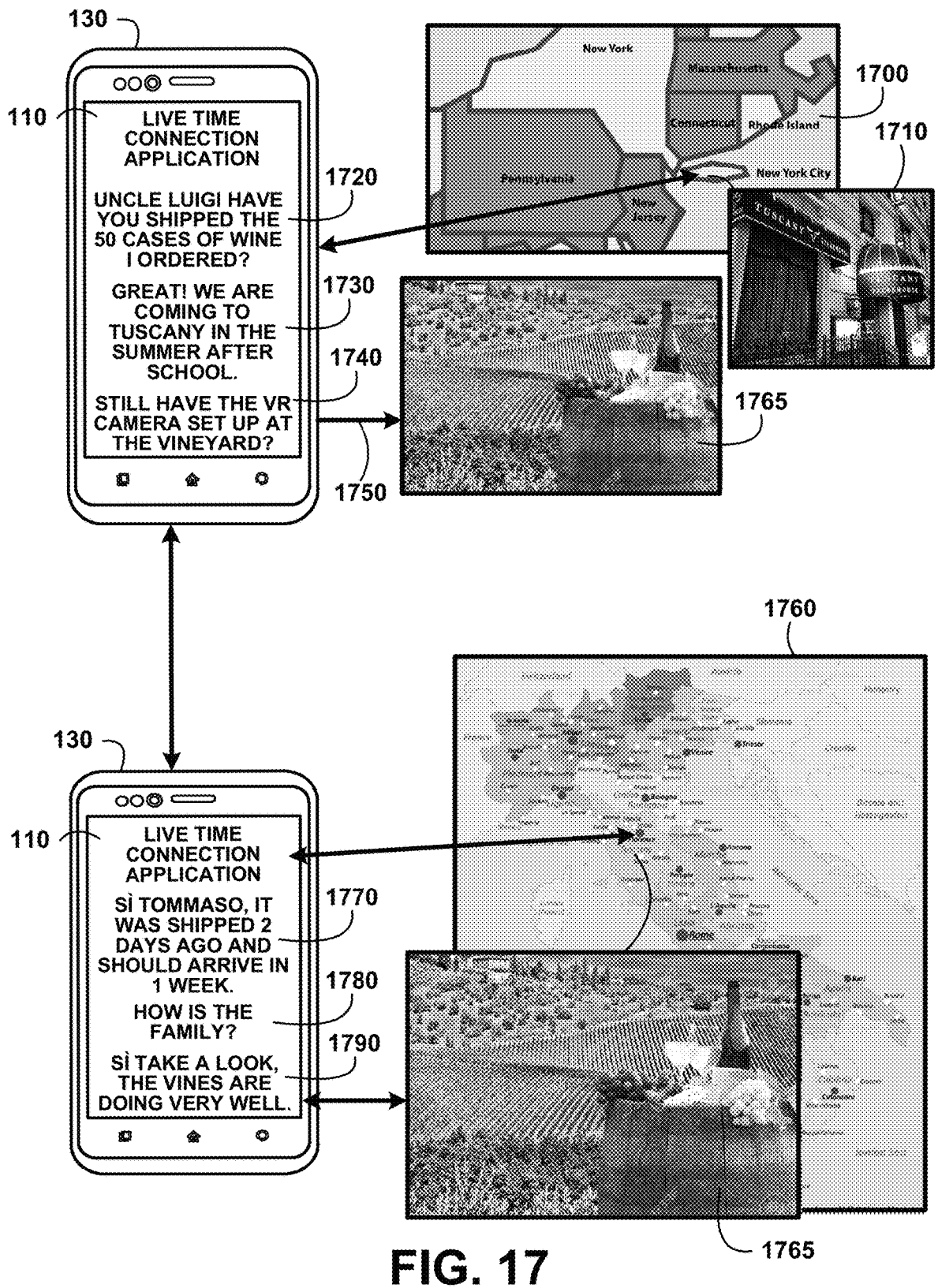
FIG. 17 shows for illustrative purposes only an example of business and social deal making worldwide of one embodiment.

Business and social deal making worldwide:

FIG. 17 shows for illustrative purposes only an example of business and social deal making worldwide of one embodiment. FIG. 17 shows the live time connection application 110 installed on a user phone 130. This user owns a restaurant and orders supplies from other countries. The location of user's restaurant is in New York City 1700. The user's restaurant 1710 is seen in a VR image from a street view. The user is placing a VR call to Tuscany, Italy 1760 to communicate with the wine vendor he orders from in Tuscany.

Showing is the Tuscany vineyard of the user's wine vendor 1765. The call begins with the user saying "Uncle Luigi have you shipped the 50 cases of wine I ordered?" 1720. The user's uncle in Tuscany replies "Si Tommaso, it was shipped 2 days ago and should arrive in 1 week." 1770. Uncle Luigi queries the user with a question "How is the family?" 1780. The user responds with "Great! We are coming to Tuscany in the summer after school." 1730. Taking advantage of the live time connection application 110 VR capability the user asks "Still have the VR camera set up at the vineyard?" 1740. Uncle Luigi replies "Si, take a look, the vines are doing very well" 1790. A VR camera signal transmitted to user's phone 1750 allows the user to see VR images of the Tuscany vineyard 1765 as though he had already made the trip.

The live time connection application 110 facilitates and provides the means for doing business worldwide. The live time connection application 110 use of reality technology closes the distance gap to bring the parties in closer contact. The live time connection application 110 also brings distant family members and friends closer together to share common experiences. And as shown in this example the two activities business and social life can be joined comfortably using the live time connection application 110 of one embodiment.

Figure 18A:
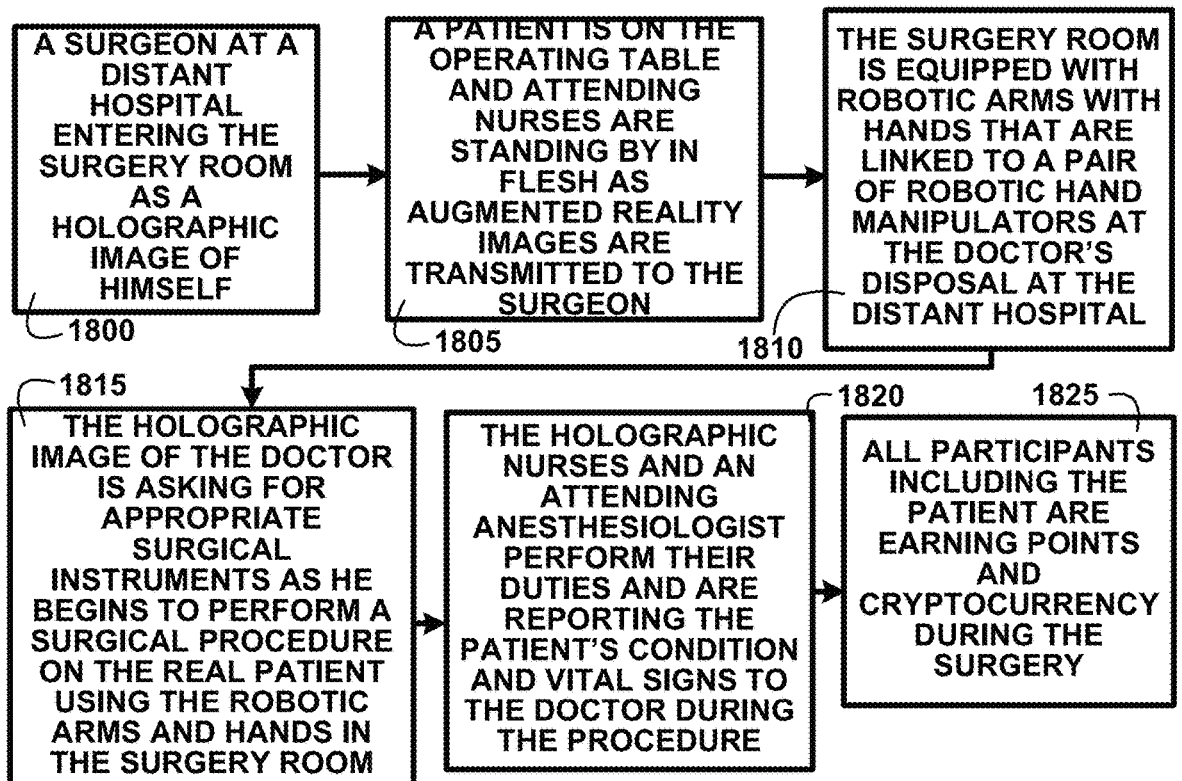
FIG. 18A shows a block diagram of an overview of a holographic doctor performing distant AR robotic surgery connection of one embodiment.

A holographic AR doctor performing distant robotic surgery connection:

FIG. 18A shows a block diagram of an overview of a holographic doctor performing distant AR robotic surgery connection of one embodiment. FIG. 18A shows a surgeon at a distant hospital entering the surgery room as a holographic image of himself 1800. A patient is on the operating table and attending nurses are standing by in flesh as augmented reality images are transmitted to the surgeon 1805. The surgery room is equipped with robotic arms with hands that are linked to a pair of robotic hand manipulators at the doctor's disposal at the distant hospital 1810. The holographic image of the doctor is asking for appropriate surgical instruments as he begins to perform a surgical procedure on the real patient using the robotic arms and hands in the surgery room 1815.

The nurses and an attending anesthesiologist perform their duties and are reporting the patient's condition and vital signs to the doctor during the procedure 1820. The holographic surgeon asks a voice activated control on the login computer to zoom in and out as needed when he is making incisions and checking the nurse's clamping veins as directed by the holographic surgeon. The nurses position the surgical instruments in the robotic hands as directed by the holographic surgeon. All participants including the patient are earning points and cryptocurrency during the surgery 1825 of one embodiment.

Figure 18B:
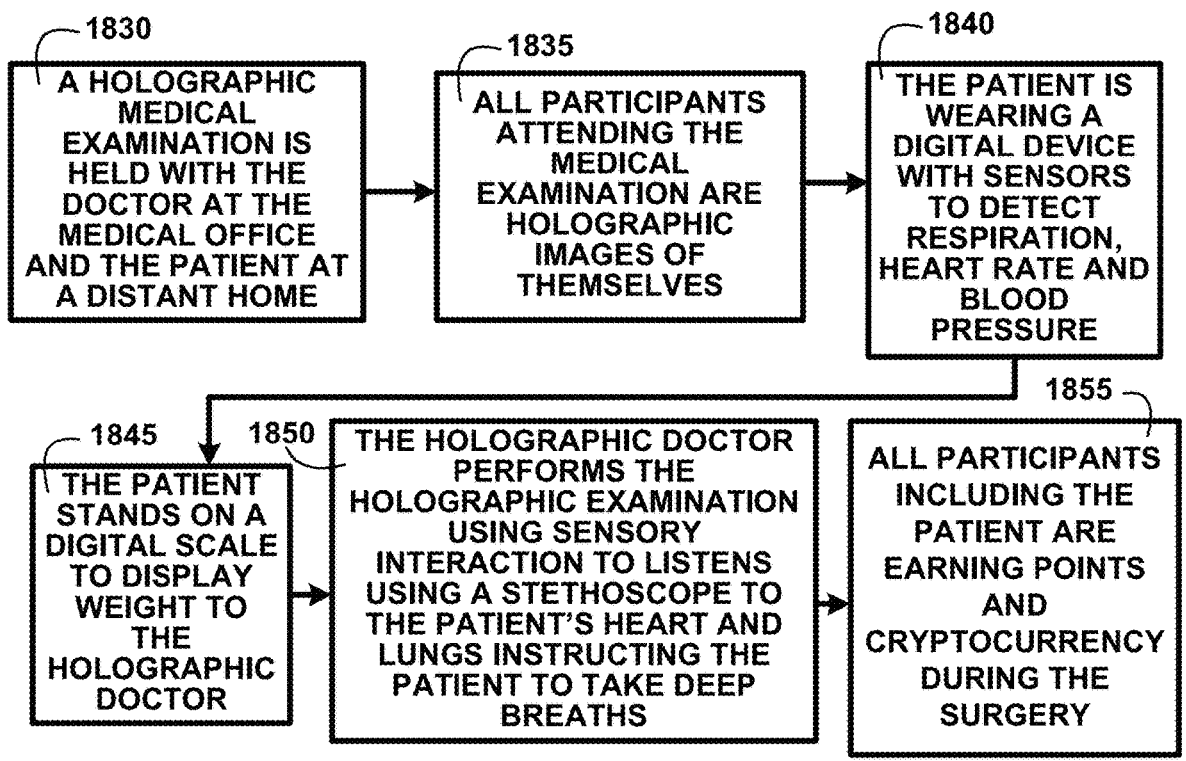
FIG. 18B shows a block diagram of an overview of a holographic AR medical examination connection of one embodiment.

A holographic AR medical examination connection:

FIG. 18B shows a block diagram of an overview of a holographic AR medical examination connection of one embodiment. FIG. 18B shows a holographic medical examination being held with the doctor at the medical office and the patient at a distant home 1830. All participants attending the medical examination are holographic images of themselves 1835. The patient is wearing a digital device with sensors to detect respiration, heart rate and blood pressure 1840. The vital signs detected by the sensors are transmitted to the doctor for viewing on a screen and are also announced by a text to voice device. The patient stands on a digital scale to display weight to the holographic doctor 1845. The holographic doctor performs the holographic examination using sensory interaction to listen using a holographic stethoscope to the patient's heart and lungs instructing the patient to take deep breaths 1850. The holographic doctor writes a holographic prescription for the patient. The holographic prescription is processed with OCR and transmitted to the patient's pharmacy for delivery to her home.

An elderly patient saves asking for a ride to the doctor's office from a neighbor and family members. The elderly patient can go about their daily activities and when the doctor calls put on their AR glasses and have the examination. Both the patient and doctor prevent any infection from personal contact and are able to perform a thorough medical examination. The record of the medical examination is noted and transcribed in the patient's EHR. The doctor's billing is prepared from the recorded examination in the EHR and is processed. All participants including the patient are earning points and cryptocurrency during the medical examination 1855. The patient will pay for the prescription using earnings from the live time connection application with their participating pharmacy of one embodiment.

Figure 19A:
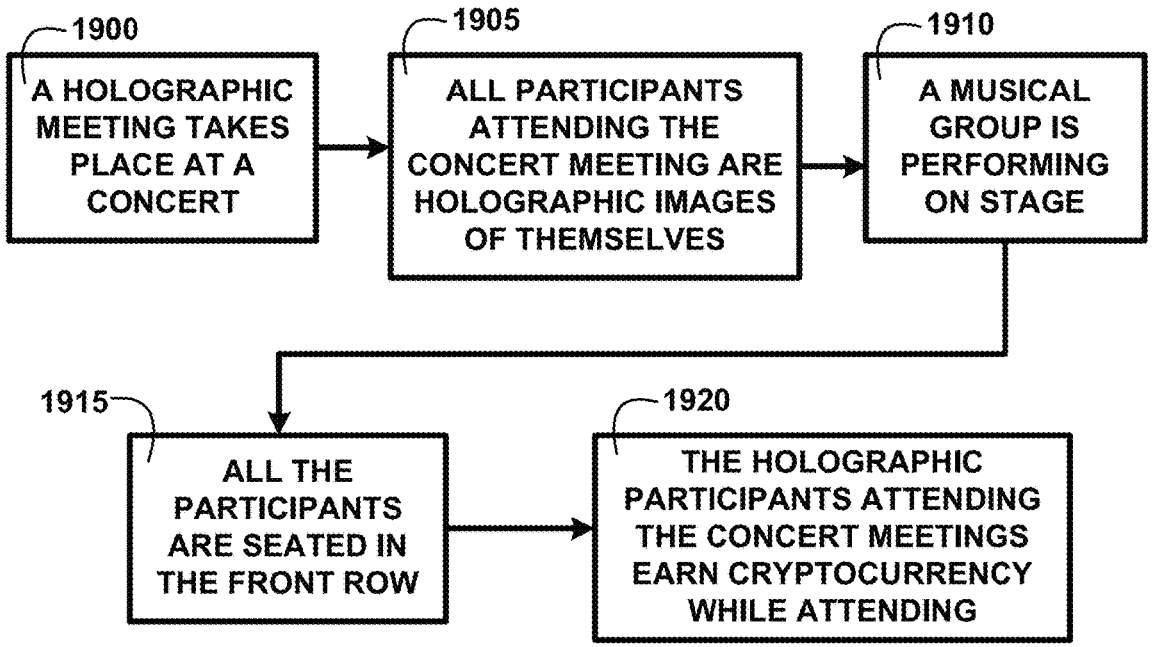
FIG. 19A shows a block diagram of an overview of a holographic AR meeting connection takes place at a concert of one embodiment.

A holographic AR meeting connection takes place at a concert:

FIG. 19A shows a block diagram of an overview of a holographic AR meeting connection takes place at a concert of one embodiment. FIG. 19A shows a holographic meeting takes place at a concert 1900. A group of friends separated by great distances decide to attend the same concert together. All participants attending the concert meeting are holographic images of themselves 1905. A musical group is performing on stage 1910. All the participants are seated in the front row 1915. Being near each other and enjoying the concert shortens the distance and strengthens the bonds between them. The memories of all of them attending the concert will spark story telling for years to come. The holographic participants attending the concert meetings earn cryptocurrency while attending 1920 of one embodiment.

Figure 19B:
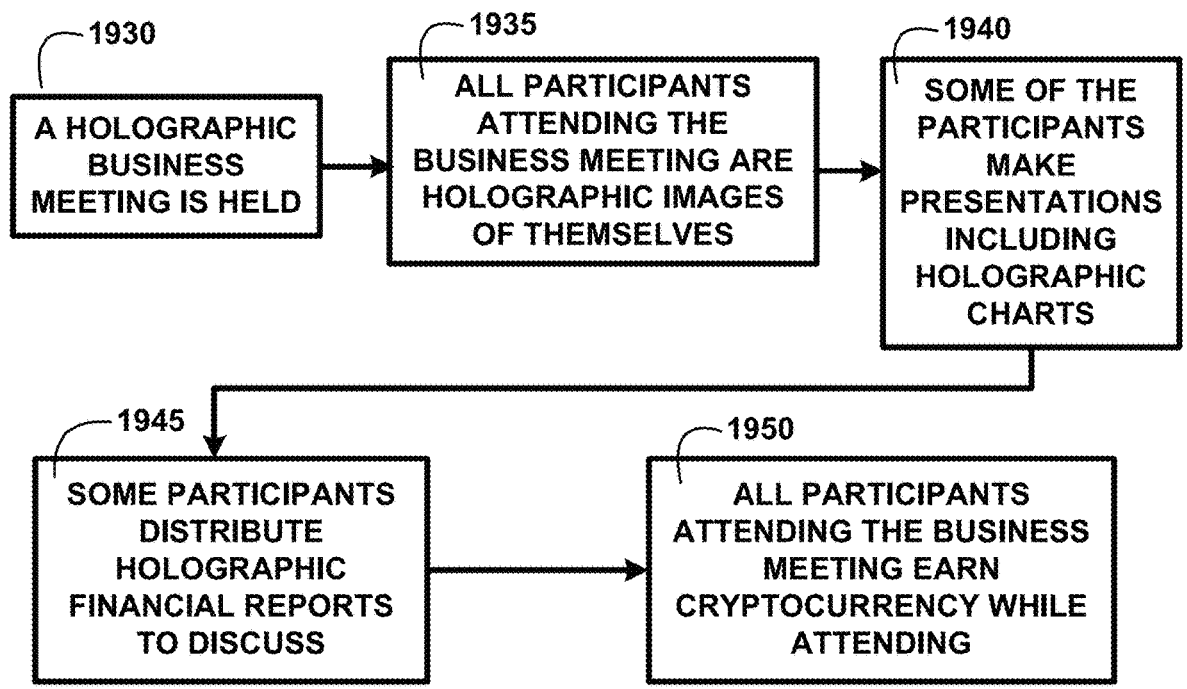
FIG. 19B shows a block diagram of an overview of a holographic AR business meeting connection of one embodiment.

A holographic AR business meeting connection:

FIG. 19B shows a block diagram of an overview of a holographic AR business meeting connection of one embodiment. FIG. 19B shows when a holographic business meeting is held 1930. All participants attending the business meeting are holographic images of themselves 1935. During the meeting all the participants see and hear each other clearly in the AR environment. Some of the participants make presentations including holographic charts 1940. Some participants distribute holographic financial reports to discuss 1945. The participants can flip pages of the holographic financial reports and then ask questions and discuss the data in the reports. All participants attending the business meeting earn cryptocurrency while attending 1950 of one embodiment.

Figure 20A:
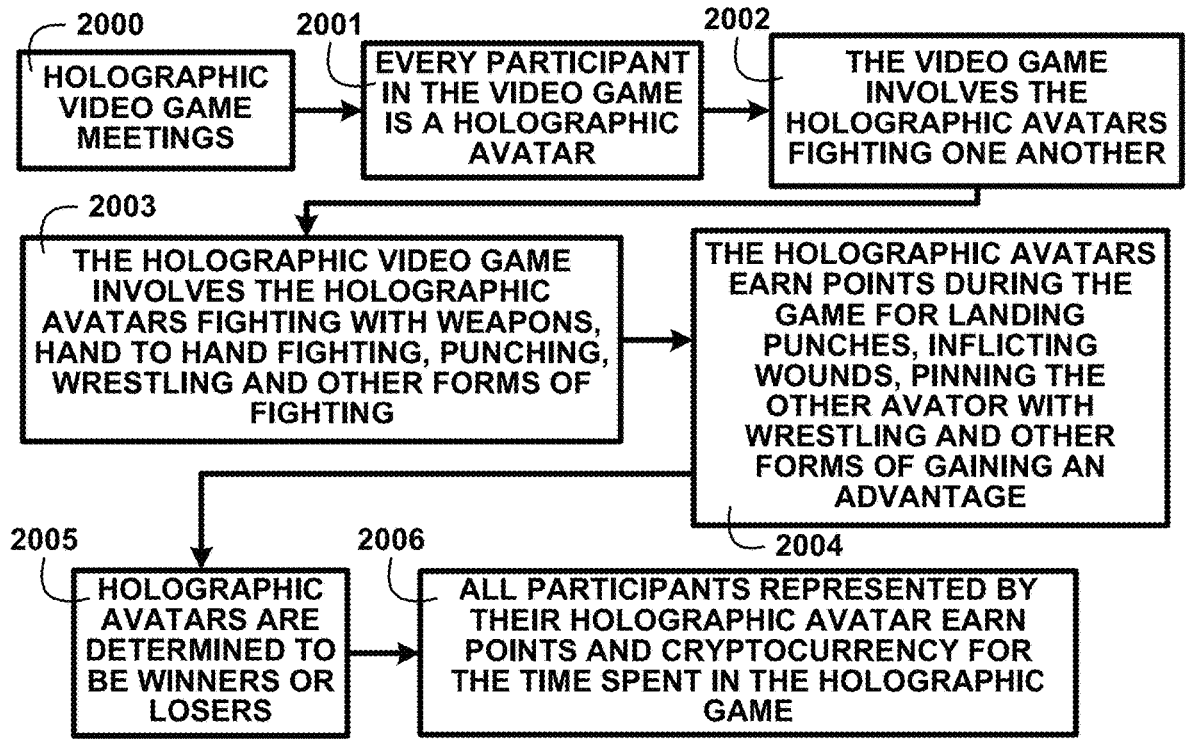
FIG. 20A shows a block diagram of an overview of a holographic AR video game meetings of one embodiment.

Holographic AR video game meetings:

FIG. 20A shows a block diagram of an overview of a holographic AR video game meetings of one embodiment. FIG. 20A shows an example of holographic video game meetings 2000. Every participant in the video game is a holographic avatar 2001.

The video game involves the holographic avatars fighting one another 2002. The holographic video game involves the holographic avatars fighting with weapons, hand to hand fighting, punching, wrestling and other forms of fighting 2003. The holographic avatars earn points during the game for landing punches, inflicting wounds, pinning another avatar with wrestling and other forms of gaining an advantage 2004. The AR video game is configured to interpret the various results of each participant's actions then assess the action to determine if an advantage has been gained. Holographic avatars are determined to be winners or losers 2005 based on the points accumulated during the period of the fighting. All participants represented by their holographic avatar earn points and cryptocurrency for the time spent in the holographic game 2006 of one embodiment.

Figure 20B:
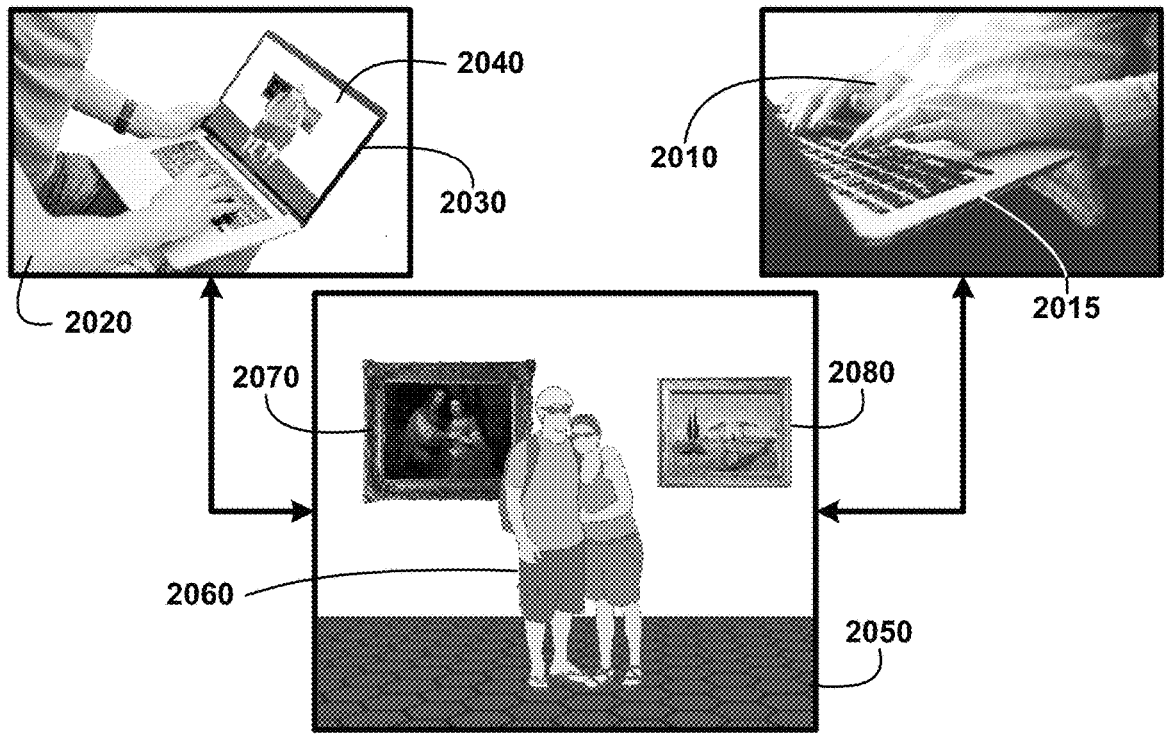
FIG. 20B shows for illustrative purposes only an example of a holographic AR dating connection of one embodiment.

A holographic AR dating connection:

FIG. 20B shows for illustrative purposes only an example of a holographic AR dating connection of one embodiment. FIG. 20B shows a male social connection date 2020 is connecting with his date using his computer in AR mode 2030. On the computer screen the male social connection date 2020 is a holographic image of him meeting his date at an art gallery 2040. A female social connection date 2010 is using her computer to meet the male social connection date in an AR location 2015. They join up at an AR real art gallery 2050. The female social connection date 2010 is seen as a holographic image of herself. In the AR real art gallery 2050 the social connection dating couple is hugging using a sensory interaction 2060 to experience the real life sensation of the hugging. The social connection dating couple views and discusses the different colors and painting techniques between a Rembrandt painting 2070 and a Van Gogh painting 2080. In real life they are both wearing AR glasses to enter the AR environment. While on the AR date they are wearing sunglasses so when they leave the art gallery they can go for a walk outdoors in the sun of one embodiment.

Figure 21:
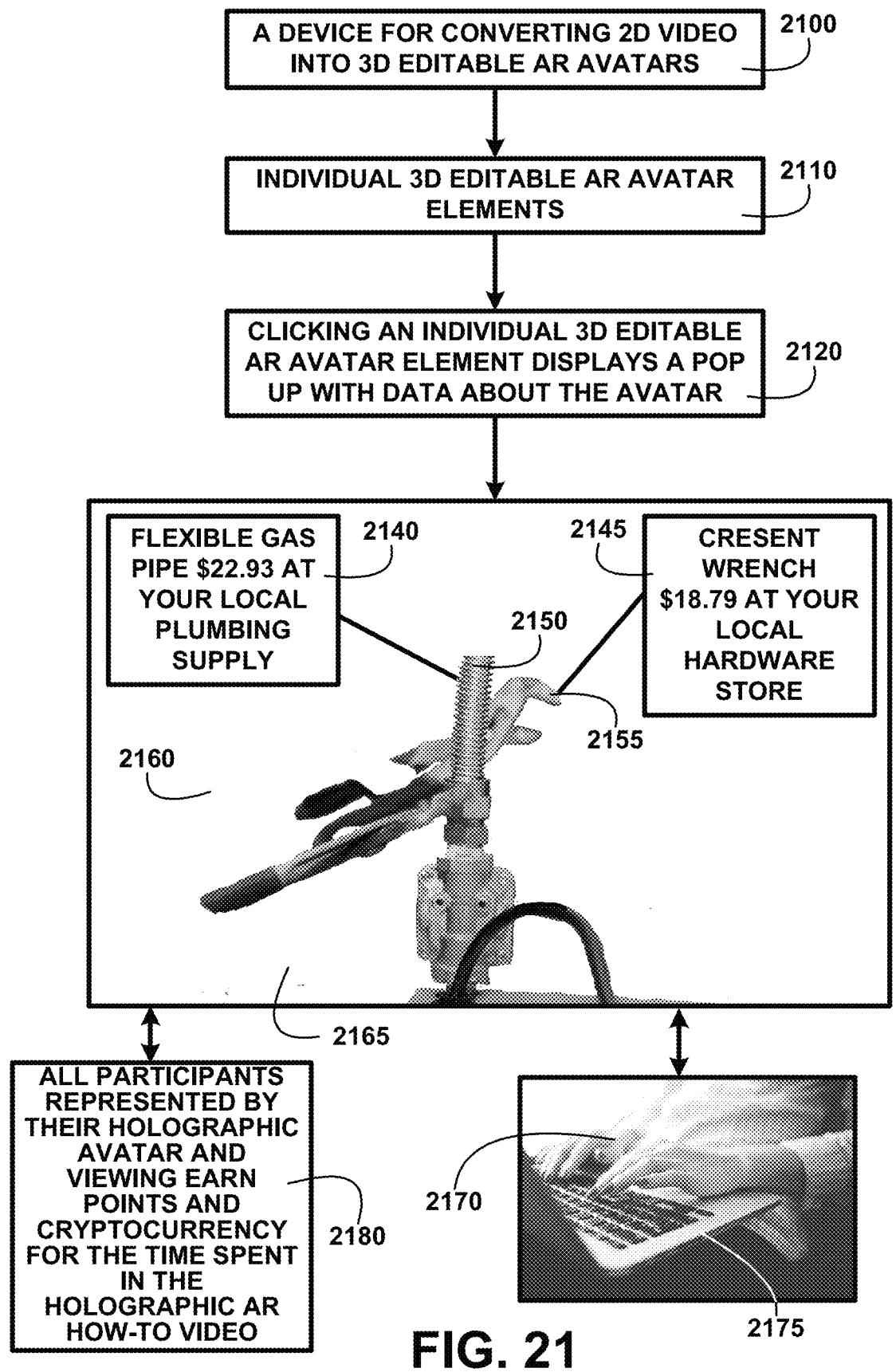
FIG. 21 shows for illustrative purposes only an example of a holographic AR how-to connection of one embodiment.

A holographic AR how-to AR connection:

FIG. 21 shows for illustrative purposes only an example of a holographic AR how-to connection of one embodiment. FIG. 21 shows a device for converting 2D video into 3D editable AR avatars 2100. Individual 3D editable AR avatar elements 2110 are the plumber instructing in the video and tools and parts including pipes and fittings used in the 3D AR video. A user viewer by clicking an individual 3D editable AR avatar element displays a pop up with data about the avatar 2120 for example a pipe. A female social connection 2170 watching in this example a how-to AR plumbing repair segment 2165 with a holographic plumber 2160 making a natural gas line replacement. A user's computer is being used to login and learn hands-on to make home plumbing repairs to save money 2175.

The female social connection clicks on a wrench 2155. A pop-up displays the type of wrench, a crescent wrench $18.79 at your local hardware store 2145. The female social connection clicks on a pipe 2150. A pop-up displays a flexible gas pipe $22.93 at your local plumbing supply 2140. The female social connection now knows the tools she needs and the type of pipe to use and the prices and where to buy them. In this example the individual 3D editable AR avatar elements are not shown as holograms for illustrative purposes only. The plumber is wearing AR gloves to enable his 3D editable AR avatar element to pick-up and handle the individual 3D editable AR avatar elements.

The female social connection puts on a pair of AR gloves. She as a holographic image enters the AR environment to try using the tool and replacing the pipe herself. She also has been earning cryptocurrency while using the app to save money. She in one embodiment barters for the tool and pipe with her social connection earnings. In another embodiment she will transfer some of her cryptocurrency for fiat currency to buy the tool and pipe.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims. All participants represented by their holographic avatar and viewing earn points and cryptocurrency for the time spent in the holographic AR how-to video 2180 of one embodiment.

What is claimed is:

1. A method, comprising:
   providing a user with options for pre-selecting advertisements to display on the user digital device;
   providing a user with the capability to experience virtual activities with a user avatar in an augmented reality environment;
   providing a user with the capability of reviewing live streaming in real time from at a location selected by the user from another participating user;
   providing the user with the capability of using crytocurrency for helping others in need;
   providing the user with the capability of earning crytocurrency and rewards through augmented reality interaction with others,
   creating a live time connection platform for providing users with live time connection application purposes including augmented reality (AR);
   generating an editable 3D holographic user likeness avatar from 2D imagery of the user's likeness for superimposing into AR environments;
   generating 3D holographic implements, wherein 2D images of implements are transformed into interactive 3D holographic implements for superimposing into AR environments;
   providing a capability for a virtual physical task using at least one device allowing a 3D holographic user likeness avatar to hold and manipulate an AR interactive 3D holographic implements to simulate virtually using the AR interactive 3D holographic implements to perform a virtual physical task;
   providing sensory real life tactile sensations using at least one multisensory device allowing a user to experience sensory real life tactile sensations through their 3D holographic user likeness avatar interactions in an AR environment;
   providing a capability of earning from a group of compensation forms comprising cryptocurrency, fiat money, credit, and award based on user participation per unit of time while users are logged into the live time connection application;
   providing a capability of earning compensation forms by users accessing saved data including at least one from a group of videos, GIFs, texts, blogs, pictures, feeds, multisensory experiences, and other content;
   providing a capability of purchasing by users using live time connection application participation earnings at on-line stores from advertisers selected by the user from geo targeted advertisers in the user's location; and
   providing a capability of reporting connection abuses, flagging abusers and reporting to police using appropriate security devices to look for key words from user reported.

2. The method of claim 1, further comprising providing at least one digital server, a live time connection website, a plurality of databases, a live time connection platform computer with the live time connection application for operations of the live time connection platform.

3. The method of claim 1, wherein the live time connection application is tracking the elapsed time a user is using the live time connection application.

4. The method of claim 1, further comprising calculating user earned cryptocurrency using recorded user application use time and recording user earnings in a user account on the live time connection platform plurality of databases.

5. The method of claim 1, further comprising providing users with live time connection application purposes including selecting from a group of augmented reality, virtual reality, altered reality, recreated reality, mixed reality, texting, games, videos, one to one communication, group and town hall meetings, multisensory experiences, video, audio, text, pictures, GIF, avatar, animation, and blog.

6. The method of claim 1, further comprising providing users with live time connection application purposes including forms of interaction with other users including at least one of a group of interactions including holographic imagery, sensory interaction, gaming, communication, avatar, animation, immersive communication, meeting, emergency communication, medical/technical procedures, distanced learning, and telehealth.

7. The method of claim 1, further comprising providing users funding streaming geo advertising with advertisers paying into an advertiser's fund for on-line store participations.

8. The method of claim 1, further comprising providing users with live time connection application purposes, wherein a purpose includes using the AR interactive 3D holographic implements to perform a virtual physical task including simulating using an AR interactive 3D holographic implement including a wrench to learn how to make a plumbing repair.

9. The method of claim 1, wherein user earned cryptocurrency is blockchain transferable and be used to buy products from advertisers.

10. The method of claim 1, further comprising the user bartering for making purchases of advertiser's products and wherein users transfer, combine, buy, sell, trade cryptocurrency using fiat money, other cryptocurrency such as bitcoin, or credit, or any other means of exchange to purchase live time cryptocurrency.

11. An apparatus, comprising:
at least one digital server, a live time connection website, a plurality of databases, at least one live time connection platform computer with a live time connection application configured for operations of a live time connection platform;
a device for generating an editable 3D holographic user likeness avatar from 2D imagery of the user's likeness for superimposing into AR environments;
a device for generating 3D holographic implements, wherein 2D images of implements are transformed into interactive 3D holographic implements for superimposing into AR environments;
a voice activated zoom in and out control device for a user to vocalize commands to zoom in and out the user's view in an AR environment;
a live time connection application form of interaction with a user sensory interaction in altered reality and recreated reality;
a live time connection application feature to conduct virtual reality business transactions worldwide;
at least one live time connection platform computer with a live time connection application is configured for providing a user with augmented reality, virtual reality, altered reality, and recreated reality, mixed reality, multisensory experiences, video, audio, text, pictures, GIF, avatar, animation, and blog;
at least one live time connection platform computer is configured for tracking a user time using the live time connection application; and
at least one live time connection platform computer is configured for calculating a user's earning of cryptocurrency for the time spent using the live time connection application for viewing saved data not limited to video, GIF, text, blog, pictures, and multisensory experiences.

12. The apparatus of claim 11, further comprising operations of a live time connection platform including operating an on-line store for users to purchase advertiser's products with earned cryptocurrency.

13. The apparatus of claim 11, further comprising the live time connection website providing users with forms of interaction with other users including at least one of a group of interactions including holographic imagery, sensory interaction, gaming, communication, avatar, animation, and immersive communication.

14. The apparatus of claim 11, further comprising live time connection application operations including geo advertising and targeted advertising based on key words, interests, demographics, geographic location, and user's profile for allowing users to choose advertisers in their location.

15. The apparatus of claim 11, further comprising a live time connection application video feature for user viewing and participating in 3d virtual reality and augmented reality videos.

16. An apparatus, comprising:
a live time connection platform configured to include at least one digital server, a live time connection website, a plurality of databases, a live time connection platform computer with a live time connection application;
a device for generating an editable 3D holographic user likeness avatar from 2D imagery of the user's likeness for superimposing into AR environments;
a live time connection application feature to find an expert in business for users wanting to meet with in a one on one connection;
a live time connection application emergency social network to allow an official to communicate to a large contingent of people to arrange rapid disaster aid;
wherein operations of the live time connection platform include providing users with forms of interaction including augmented reality;
at least one device for automatically executing a set of rules stored on blockchain ledgers that are decentralized and stored on a number of data storage facilities and locations and is tampered resistant and are synchronized to record changes made to it over all the ledgers; and
a live time connection applications installed on a user's digital device for using forms of interaction and for earning cryptocurrency for the time the user is using the live time connection application forms of interaction including virtual reality, altered reality, and recreated reality, mixed reality, multisensory experiences, video, audio, text, pictures, GIF, avatar, animation, and blog.

17. The apparatus of claim 16, further comprising forms of interaction including at least one of a group of interactions including holographic imagery, sensory interaction, gaming, communication, avatar, animation, and immersive communication.

18. The apparatus of claim 16, further comprising a device for transmitting town hall meeting organizers geo advertising of a product launch during a town hall meeting.

19. The apparatus of claim 16, further comprising geo advertising for allowing users to choose advertisers in their location and for a user to select a form of making purchases from advertisers from a group of using earned cryptocurrency, using fiat money, other cryptocurrency such as bitcoin, credit, or any other means of exchange, and bartering for making purchases of advertisers products.

20. The apparatus of claim 16, further comprising providing users with live time connection application purposes including at least one of a group including video selections of 3D virtual reality, movies, TV series, travel documentaries, 3D images, glasses, holographic technology, avatar, animation, multisensory experiences, recreated reality, augmented reality, mixed reality, phone communication, audio, text, saved data, images, and other video selections.

* * * * *